United States Patent [19]

Circo

[11] Patent Number: 4,677,614

[45] Date of Patent: Jun. 30, 1987

[54] DATA COMMUNICATION SYSTEM AND METHOD AND COMMUNICATION CONTROLLER AND METHOD THEREFOR, HAVING A DATA/CLOCK SYNCHRONIZER AND METHOD

[75] Inventor: Miles M. Circo, Ijamville, Md.

[73] Assignee: EMC Controls, Inc., Hunt Valley, Md.

[21] Appl. No.: 466,560

[22] Filed: Feb. 15, 1983

[51] Int. Cl.[4] .............................................. H04J 3/06

[52] U.S. Cl. ...................................... 370/86; 370/103; 375/118; 375/107

[58] Field of Search .................... 370/86, 100, 103, 85, 370/16, 89; 375/118, 119, 120, 107; 340/825.05

[56] References Cited

U.S. PATENT DOCUMENTS

| | | | |
|---|---|---|---|
| 3,940,558 | 2/1976 | Gabbard et al. | 370/103 |
| 4,004,225 | 1/1977 | Ganssmantel | 370/104 |
| 4,042,783 | 8/1977 | Gindi | 370/86 |
| 4,064,486 | 12/1977 | Faber | 370/86 |
| 4,119,796 | 10/1978 | Jones | 375/118 |
| 4,216,544 | 8/1980 | Boleda et al. | 375/119 |
| 4,398,288 | 8/1983 | Mizokawa et al. | 370/100 |
| 4,596,012 | 6/1986 | Reed | 370/16 |

*Primary Examiner*—Douglas W. Olms
*Attorney, Agent, or Firm*—Reginald F. Pippin, Jr.

[57] ABSTRACT

A communication system and method is provided, in which synchronous (i.e., clocked) serial digital data may be sent and received from any given node to any other given node along a multinode loop of any desired mode quantity, with each node being capable of and maintained ready to assume the role and function of master node to provide the time-base or master clock for the loop. One node will serve as master node and all other nodes as slave nodes until the master becomes inoperable in its master clock function or until it is removed from the loop, at which time another node will assume the role of master node, and this status will continue as above-indicated. Small loop size is accommodated by adding a suitable delay to retransmitted data at the master node. Each node has clock recovery and both recovered clock/data synchronization means and its on-board master clock/data synchronization means (which latter is close to the same frequency at each node, but independent in frequency and phase at each node) to enable each node to serve as either master or slave node by internal switching selection of communication control output of either recovered clock data or master clock data for use and retransmission at each node, dependent on its instant self-intended role as slave or master.

Master clock data synchronization at the master node is effected by shifting recovered clock data by a selected phase as a function of phase difference between the instant master node master clock and recovered clock at such master node, the selected phase shift being an amount sufficient to enable effective sampling by the master clock, to thereby provide absolute phase synchronization of receive data with master clock for internal serial processing, utilization, and retransmission by the instant master node. Each instant slave node has its own on-board such master clock data synchronizing means which may be maintained on standby, for enabling each assumption of the master node role, as may be required.

39 Claims, 16 Drawing Figures

| Flag 01111110 | Destination Address | Control Field | Source Address | Information Field | Frame Check Sequence | Flag 01111110 |
|---|---|---|---|---|---|---|
| (8 Bits) | (8 Bits) | (8 Bits) | (8 Bits) | (Unrestricted) | (16 Bits) | (8 Bits) |

LOOP DATA FRAME FORMAT

OR

| Go-Ahead 01111111 |
|---|
| (8 Bits) |

```
Count   LSB        MSB
  0  —  0 1 0 0 0 0
  1  —  1 1 0 0 0 0
  2  —  0 0 1 0 0 0
  3  —  1 0 1 0 0 0
  4  —  0(1 1)0 0 0    ← A51-A6 Active, Inhibits A52-A5 Change
  5  —  0 1 0 1 0 0
  6  —  1 1 0 1 0 0
  7  —  0 0 1 1 0 0
  8  —  1 0 1 1 0 0
  9  —  0(1 1)1 0 0    ←
 10  —  0 1 0 0 1 0
 11  —  1 1 0 0 1 0
 12  —  0 0 1 0 1 0
 13  —  1 0 1 0 1 0
 14  —  0(1 1)0 1 0    ←
 15  —  0 1 0 1 1 0
 16  —  1 1 0 1 1 0
 17  —  0 0 1 1 1 0
 18  —  1 0 1 1 1 0
 19  —  0(1 1)1 1 0    ← RxD Sampled For Early/Late re RC
 20  —  0 1 0 0 0 1      Relative Error Sense At A33-9
 21  —  1 1 0 0 0 1      Absolute Error Sense (ES) At A31-8
 22  —  0 0 1 0 0 1
 23  —  1 0 1 0 0 1
 24  —  0(1 1)0 0 1    ←
 25  —  0 1 0 1 0 1
 26  —  1 1 0 1 0 1
 27  —  0 0 1 1 0 1
 28  —  1 0 1 1 0 1
 29  —  0(1 1)1 0 1    ←
 30  —  0 1 0 0 1 1
 31  —  1 1 0 0 1 1
 32  —  0 1 1 0 1 1
 33  —  1 0 1 0 1 1
 34  —  0(1 1)0 1 1    ←
 35  —  0 1 0 1 1 1  ⎫
 36  —  1 1 0 1 1 1  ⎬ A42B-8 Enable
 37  —  0 0 1 1 1 1  ⎭
 38  —  1 0 1 1 1 1
 39  —  0(1 1)1 1 1    ←
```

A43-12 - 1 MHZ.
A43-13 - 2 MHZ.
A43-14 - 4 MHZ.
A44A-5
A52B-9
A52A-5

```
                                            Count Sequence
                                            39   0
 0  —  0 1 0 0 0 0 (÷40) If No Update Clk.  39  40   1  (For late RxD)
40  —  1 0 0 0 0 0 (÷41) If Error Sense = 1 39   1       (For Early RxD)
 1  —  1 1 0 0 0 0 (÷39) If Error Sense = 0

÷40  Normal - No Update Clk.   37-38-39-0-1-2
            ÷39  Update With Error Sense = 0  37-38-39-1-2
            ÷41  Update With Error Sense = 1  37-38-39-40-0-1-2
```

DATA COMMUNICATION SYSTEM AND METHOD AND COMMUNICATION CONTROLLER AND METHOD THEREFOR, HAVING A DATA/CLOCK SYNCHRONIZER AND METHOD

This invention relates to a multinode network communication system and method, and to a synchronous data communication controller arrangement and synchronous data control method for use as an integral part of said communication system and method, and in which data is serially transmitted from node to node around a multinode link, loop or ring network, and to a data/clock synchronizer and method which is employed in such controller and data communication system.

Various approaches have been utilized to enable multinode commmunication, including a ring network system in which a master control node or station transmits messages in packet form to any node on a multinode loop, by serial data communication sequentially from node to node, on a one-bit delay per slave node for retransmission to the loop, and back to the master node. A multibit (e.g., eight-bit) control token or go-ahead character is transmitted by the master when it has no message to send or when it concludes transmission. This control token or go-ahead is passed sequentially around the loop or ring. Any node, upon receiving the control token, may remove the token from the ring, replacing it with a flag or synch character, and transmit a message onto the loop, after which it reinserts and passes on the control token to the next succeeding node. In such system, all messages are sent to or from the master and if one node wishes to communicate with another node, the message is sent to the master node, which removes the message from the loop and thereafter reframes and retransmits the message as a message to the particular intended recipient node, after which the message again propagates through the loop and back to the master where it is removed. In this system, the master node is fixed and does not change, and the master provides the master clock time-base for the entire loop.

While this fixed single-master node multinode system enables full communication between all nodes, it is inefficient, particularly in its requirement for breaking the loop to totally remove and retransmit slave-to-slave node messages. In addition, while any slave node may become inoperable and be switched out of the network without harm to the integrity of the remaining multinode loop network, loss of the master node will terminate the operation of the entire network.

While other loop or ring network systems have been proposed or used, in which any node may in some fashion assume the status of master, in all of such systems to my knowledge, each message is removed by the node sending the message, as in the case of the fixed single master control node discussed above. This is likewise a somewhat inefficient system and method of communication.

Further prior multinode communication systems include common bus contention networks in which each node has equal access to a common transmission bus for direct access between nodes, and in which each node is provided with collision detection means for preventing continued transmission onto the bus by two nodes at the same time. In each contention networks, when a node transmits a packet for another node, the data packet is transmitted onto the common bus. The transmission is heard by all nodes and is copied by the destination nodes. There is no routing or serial retransmission from node to node, and control is fully distributed. While this system affords effective direct communication between nodes once the bus is effectively accessed, it nevertheless has substantial need for collision avoidance accommodation or means to keep the number of collisions and retransmissions acceptably small. While such can be reasonably achieved with a small number of nodes by using a sufficiently broad bandwidth, assuming that network traffic on the average consumes a small percentage of available bandwidth, as the number of nodes increases, this approach becomes overly expensive and burdensome, as increased bandwidth must be provided (which can be prohibitively expensive or unavailable) and/or increased collisions, delays and retransmissions must be accepted.

Further prior node communication systems include star networks, which also rely upon a central master control node communicating directly with each of a plurality of nodes, which are only connected to one another through the central master control node. Again, these systems are inefficient for slave-to-slave communications, and are susceptible to total failure upon the loss of the central master control node.

It is an object and feature of the present invention to provide a multinode serial data loop or link communication system and method in which each node may serve as either a master node or a slave node, with absolute phase synchronization by the instant master node of master-node receive data with the instant master-node master clock. The term "absolute phase synchronization" as used in the foregoing statement and elsewhere in the Specification and Claims is intended to mean that the bit or pulse start time for each of two given digital signals is identical, the signals in the preceding sentences being, respectively, the master-node receive data signal and the master-node master clock signal itself.

It is an object and feature of the present invention to provide a multinode serial data loop or link communication system and method in which each node may serve as either a master node or a slave node, with absolute phase synchronization by the instant master node of out-of-phase receive data with the instant master-node master clock, and which enables full receipt, use, and retransmission of all received messages by any and all nodes around the loop, without necessity of breaking the loop at any node for taking the messages off the loop or link.

A further object and feature is the provision of a synchronous communication controller arrangement and method which enables any dual master/slave node of a multinode serial data communication loop to serve as a master node providing the loop time-base, or as a slave node which slaves to the time-base provided by the master clock of another similar master/slave node acting as instant loop master, and in which the receive data is brought into absolute phase synchronization with master clock.

Still a further object and feature is the provision of a data/clock synchronizing means and method, in which first clocked data in synch with a first clock having a frequency substantially identical with a second clock but of uncertain phase relation thereto, is selectively phase-shifted as a function of the phase difference between the first clock and a second clock, to enable effective sampling of the first clocked data, and the selectively phase-shifted first clocked data is effectively sampled with the second clock to provide absolute phase synch of the resulting thus sampled data with the second clock.

Still other objects, features and attendant advantages will becone apparent to one skilled in the art from the following detailed description of an illustrative preferred embodiment, taken in conjunction with the accompanying drawings, in which.

Figure 1:
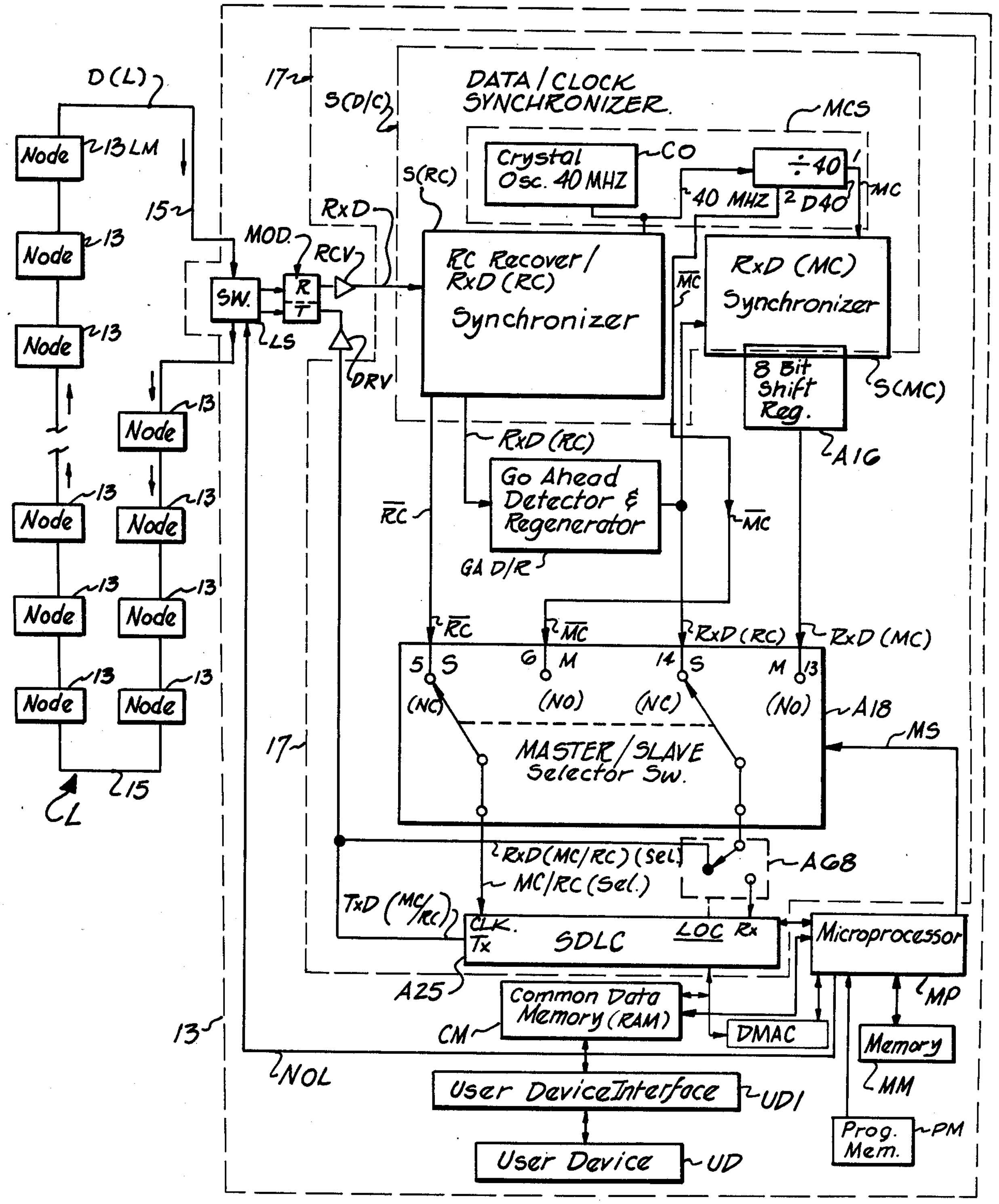
FIG. 1 is a block diagram of a multinode synchronous data communication system according to an illustrative and preferred embodiment of the invention.
Figure 2:
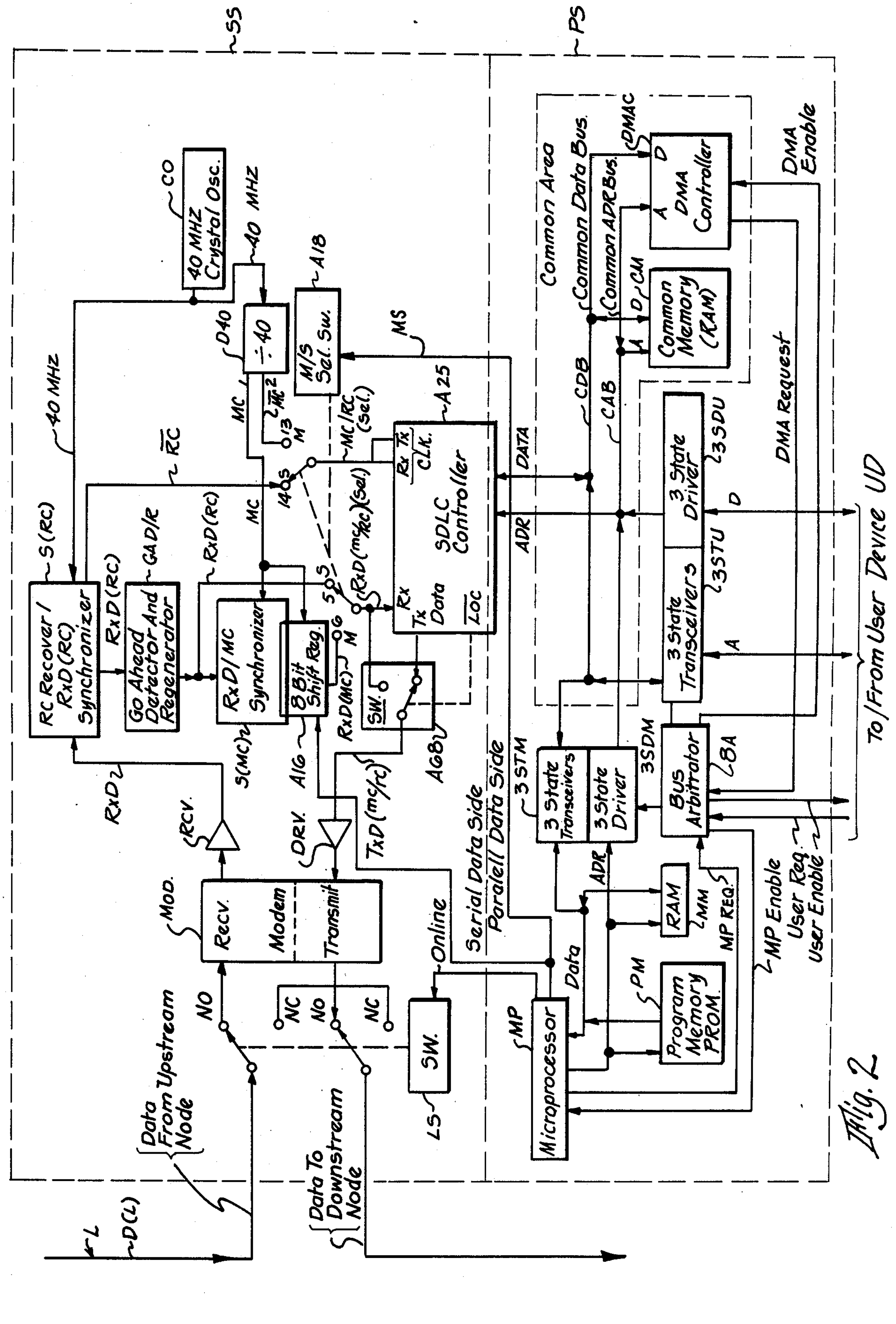
FIG. 2 is a more detailed block diagram of a single node embodying the invention and embodying an illustrative preferred communication controller arrangement and method according to the invention.
Figure 3A:
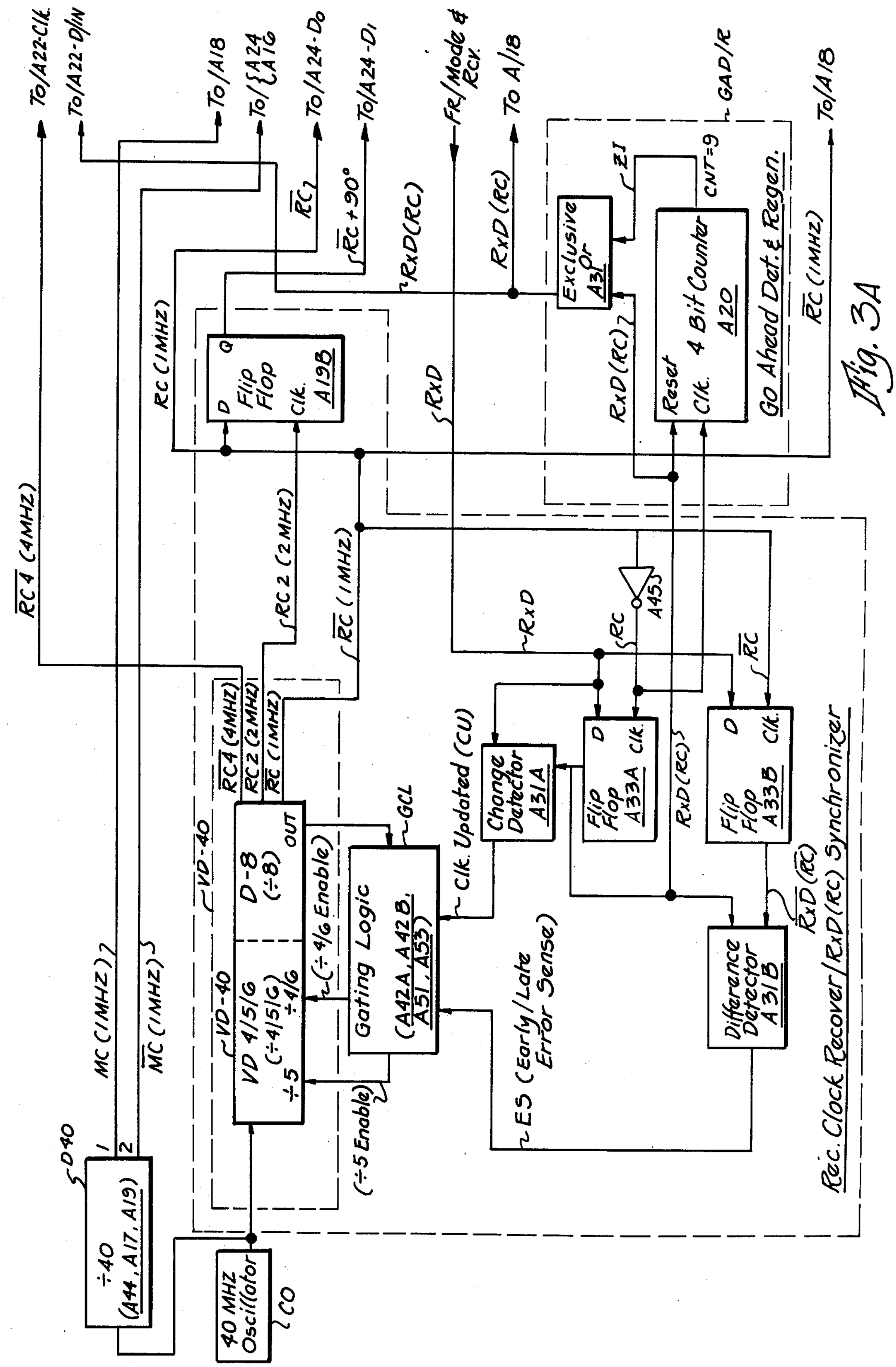
Figure 3B:
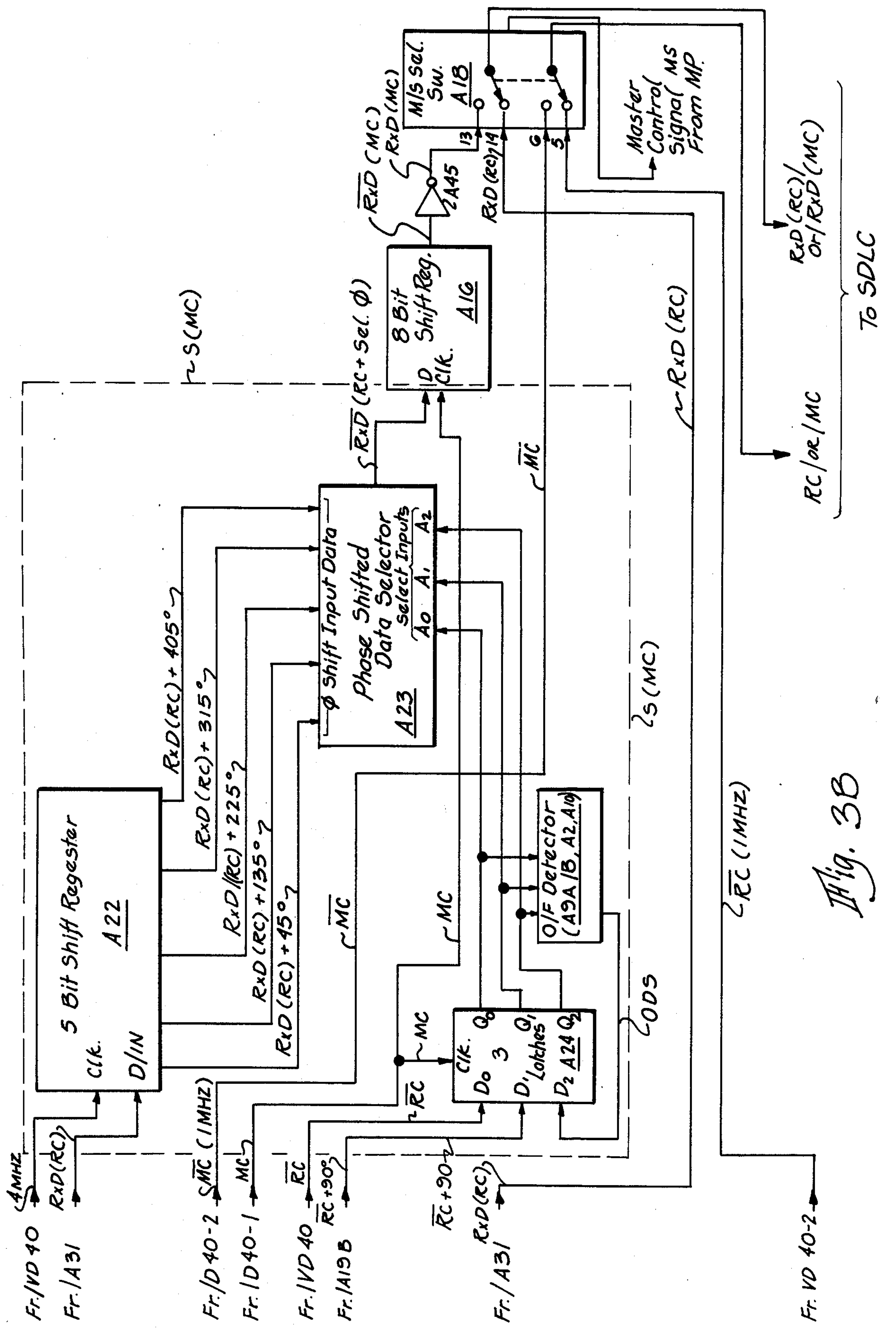

FIGS. 3A and 3B together form a further more detailed block diagram of a master/slave communication controller arrangement as employed in FIGS. 1 and 2.

Figure 4:
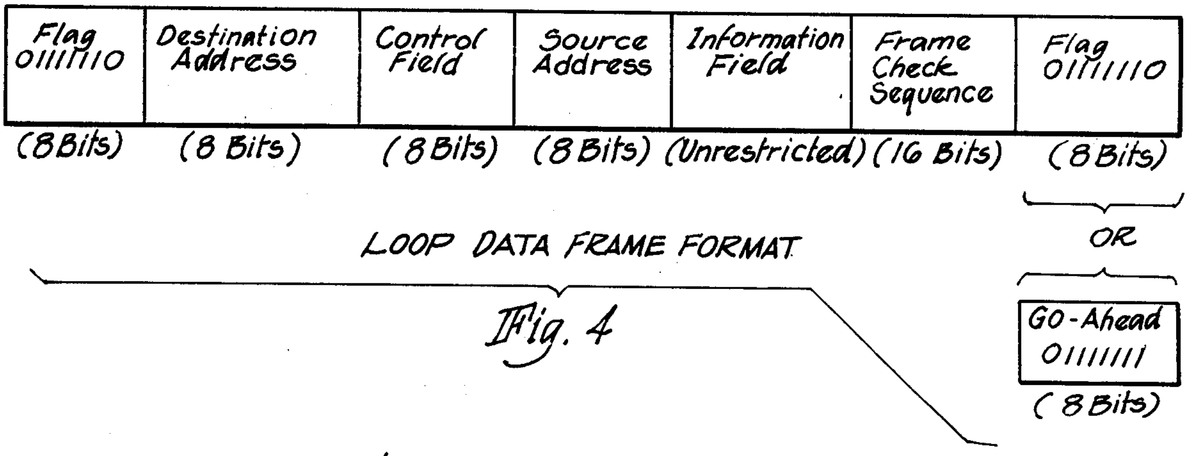

FIG. 4 is a schematic diagram of a typical loop data frame format which may be employed in the system and method according to the invention.

Figure 5A:
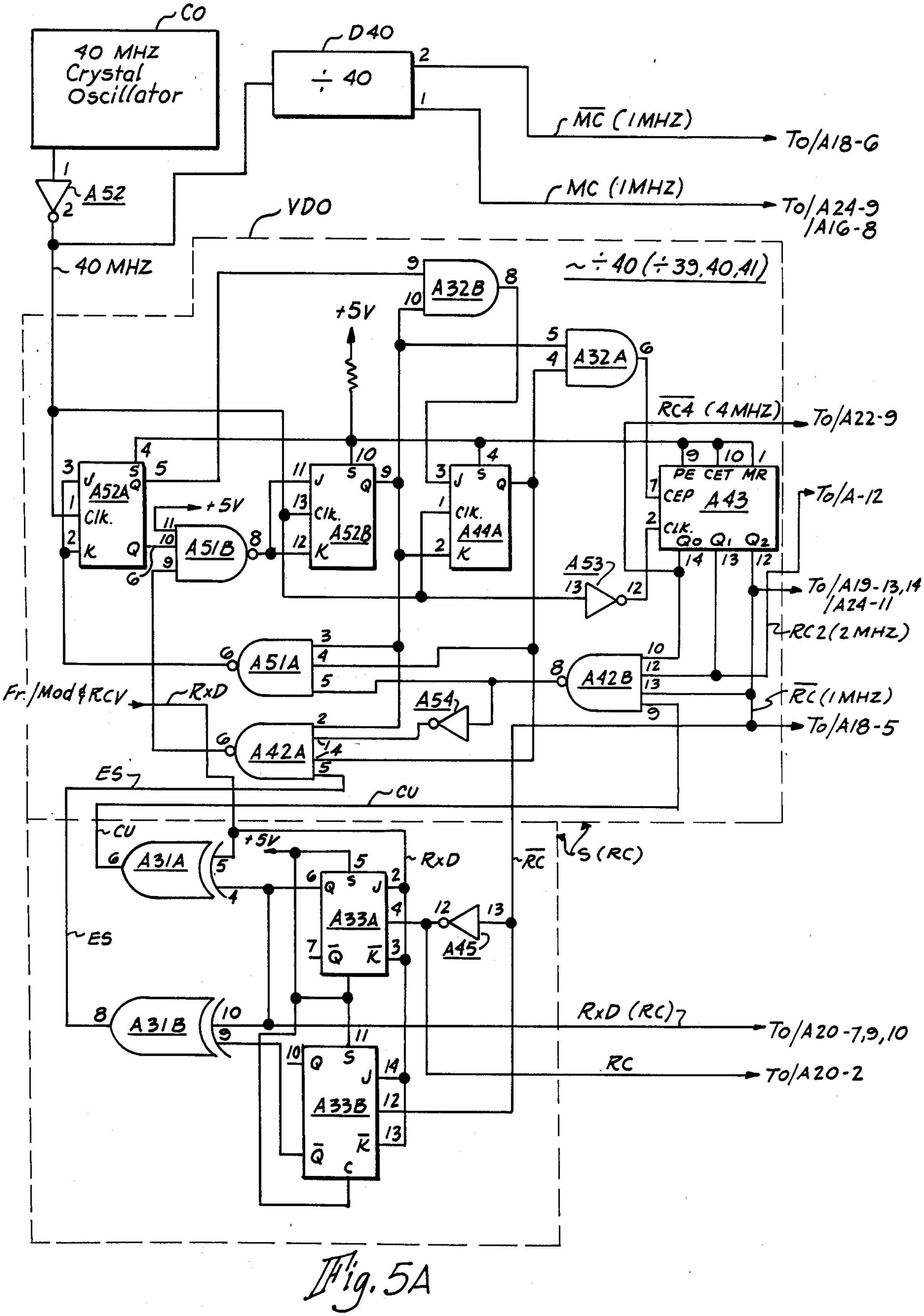
Figure 5B:
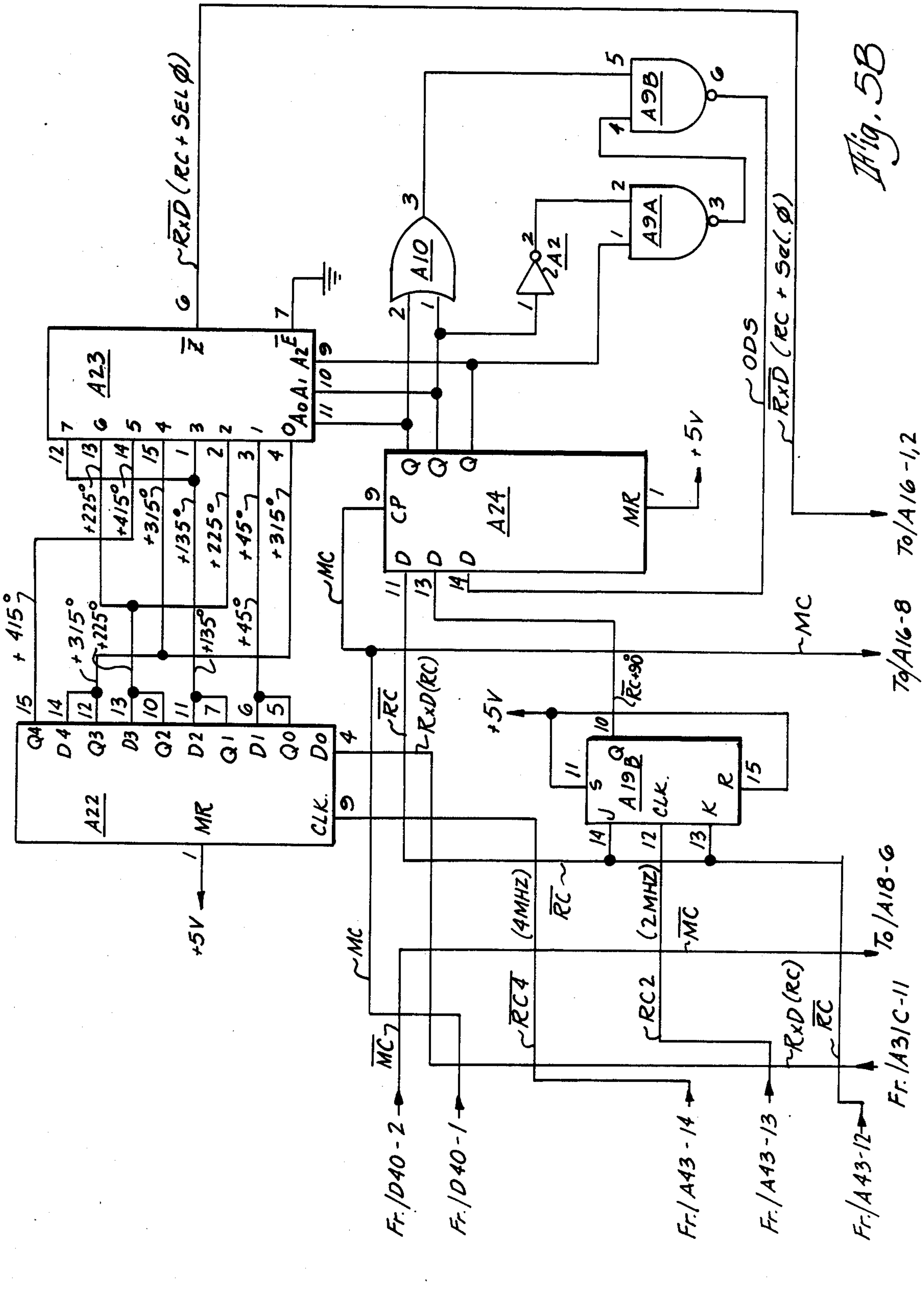
Figure 5C:
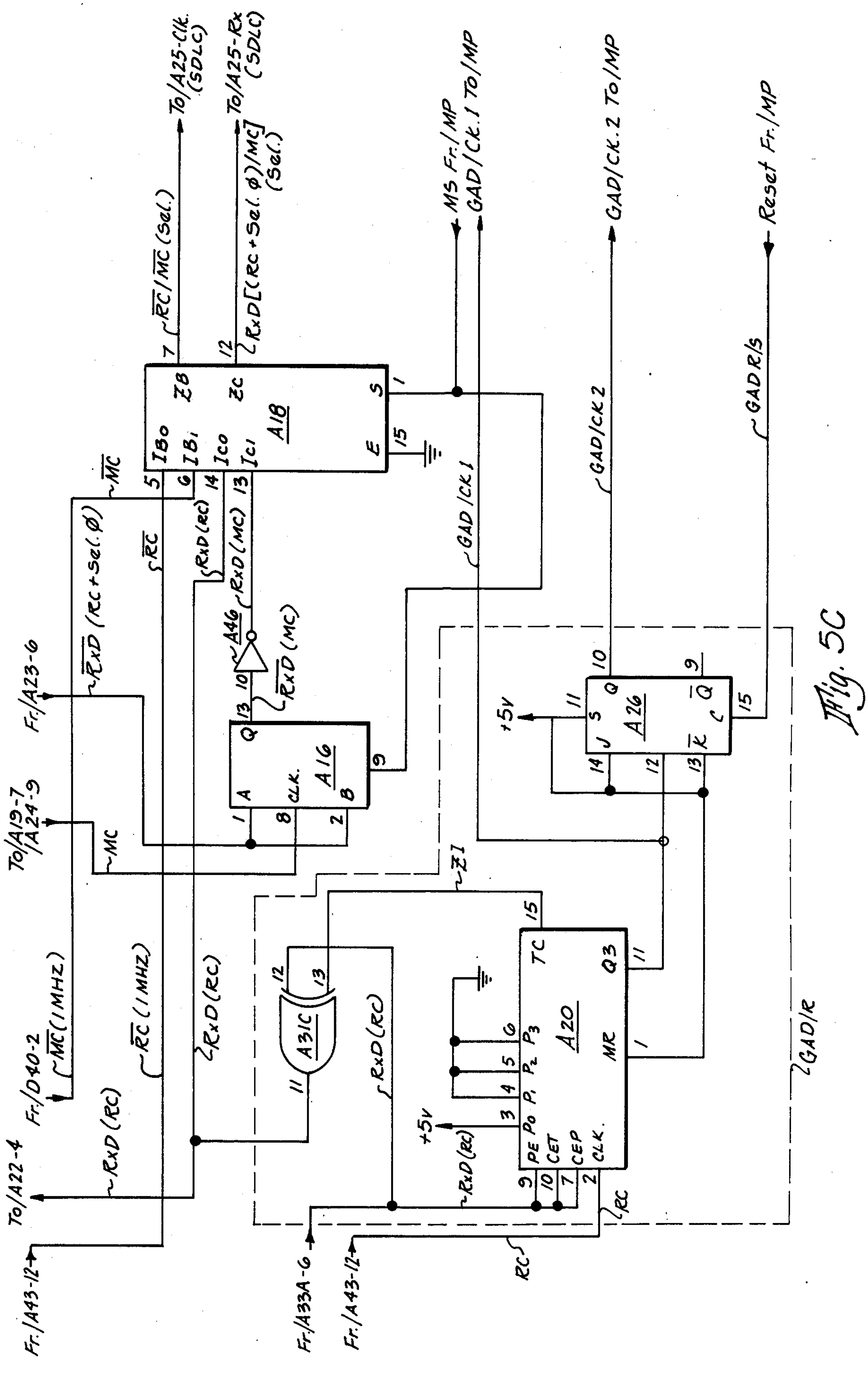

FIGS. 5A, 5B and 5C together form a detailed schematic diagram of a preferred embodiment of the master/slave communication controller of FIGS. 3A and 3B.

Figure 6A:
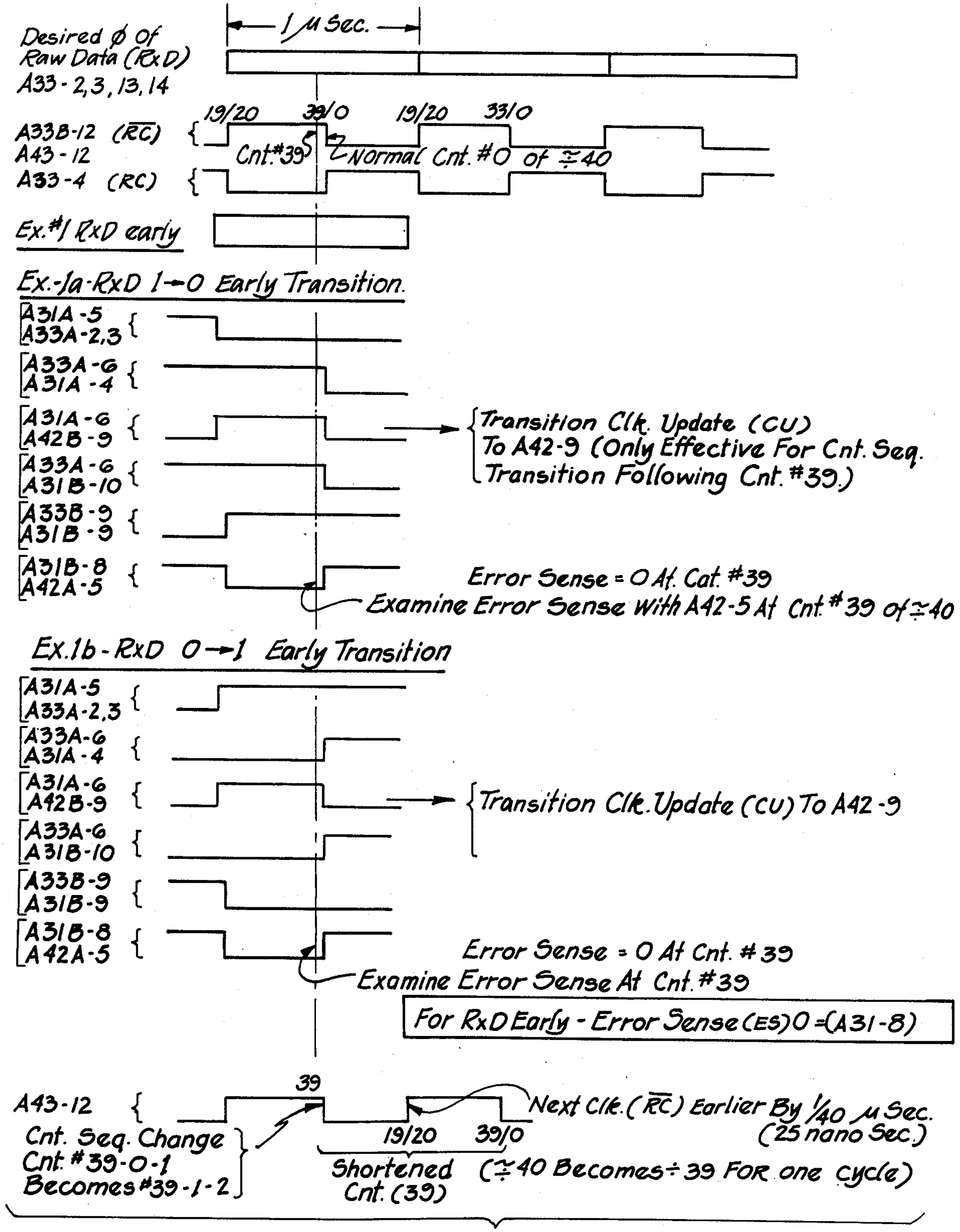
Figure 6B:
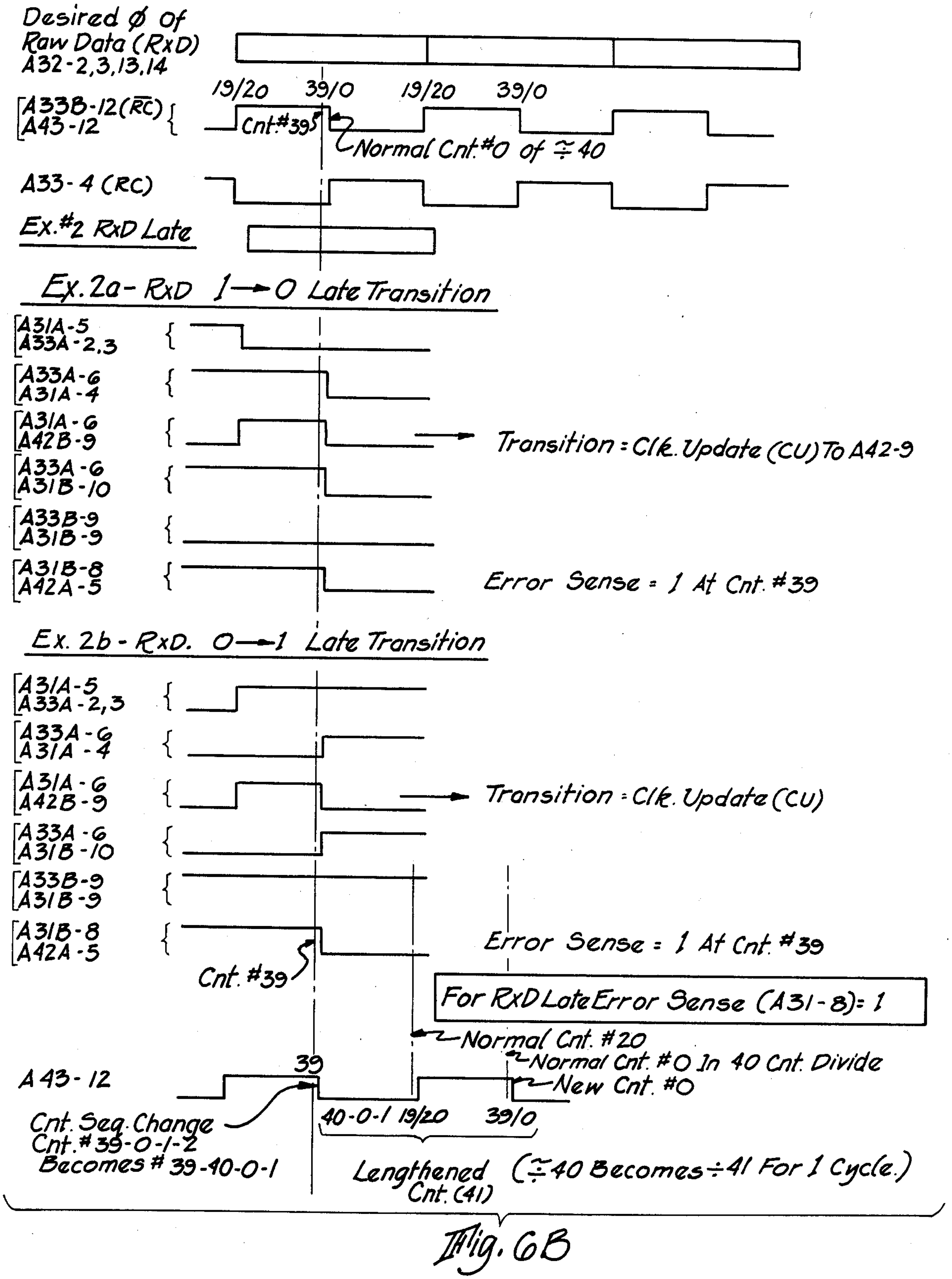

FIGS. 6A and 6B are timing diagrams illustrating operation of the receive clock recovery and synchronization system and methods according to a preferred embodiment of the invention.

Figure 7:
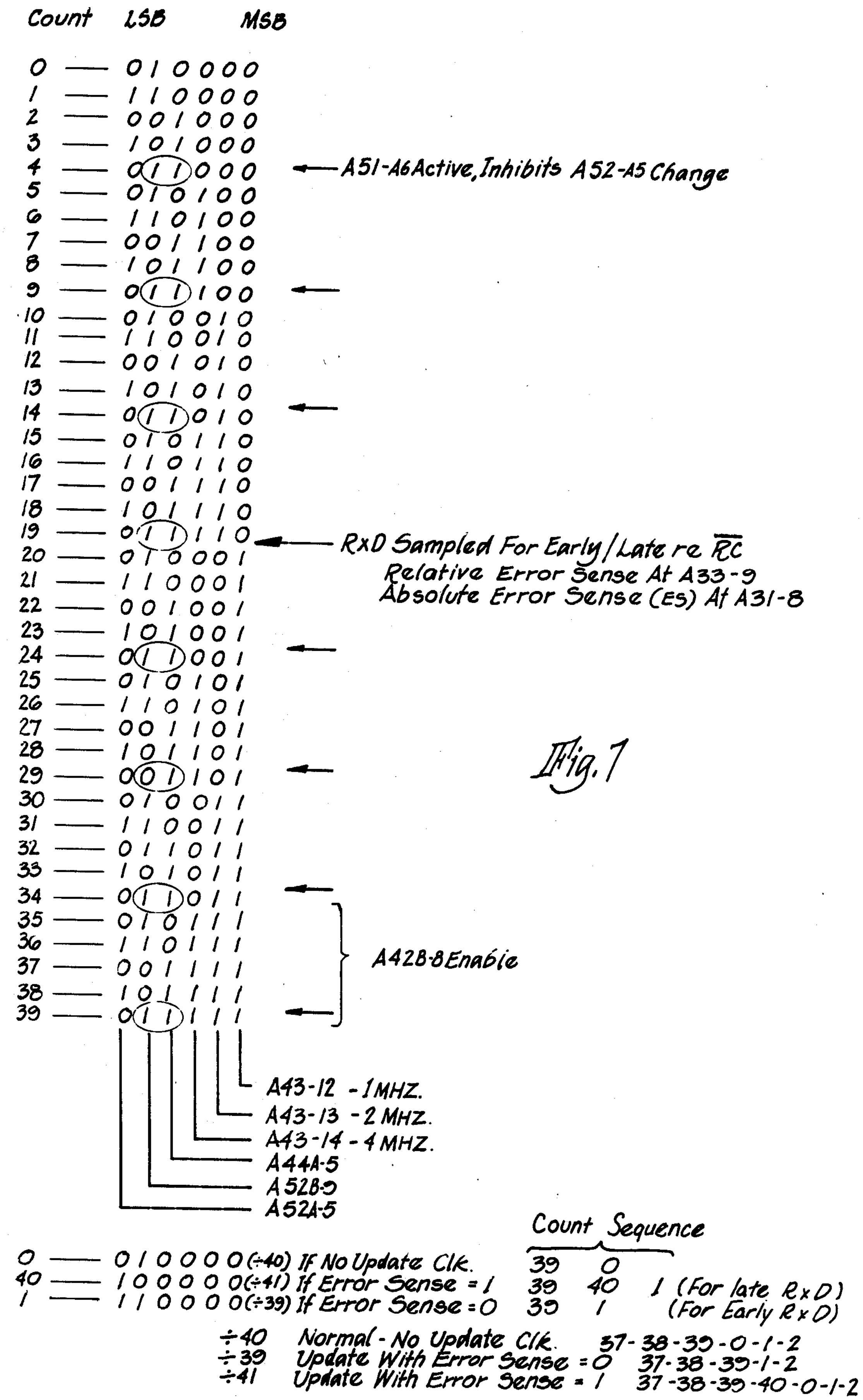

FIG. 7 is a sequential count truth table diagram illustrating the operation of a variable divider according to a preferred embodiment of the invention and as utilized in FIGS. 1–3.

FIGS. 8A, 8B, 8C and 9 are timing diagrams illustrating operation of the master clock/receive data absolute phase synchronization arrangement and method according to an illustrative preferred embodiment of the invention.

Figure 10:
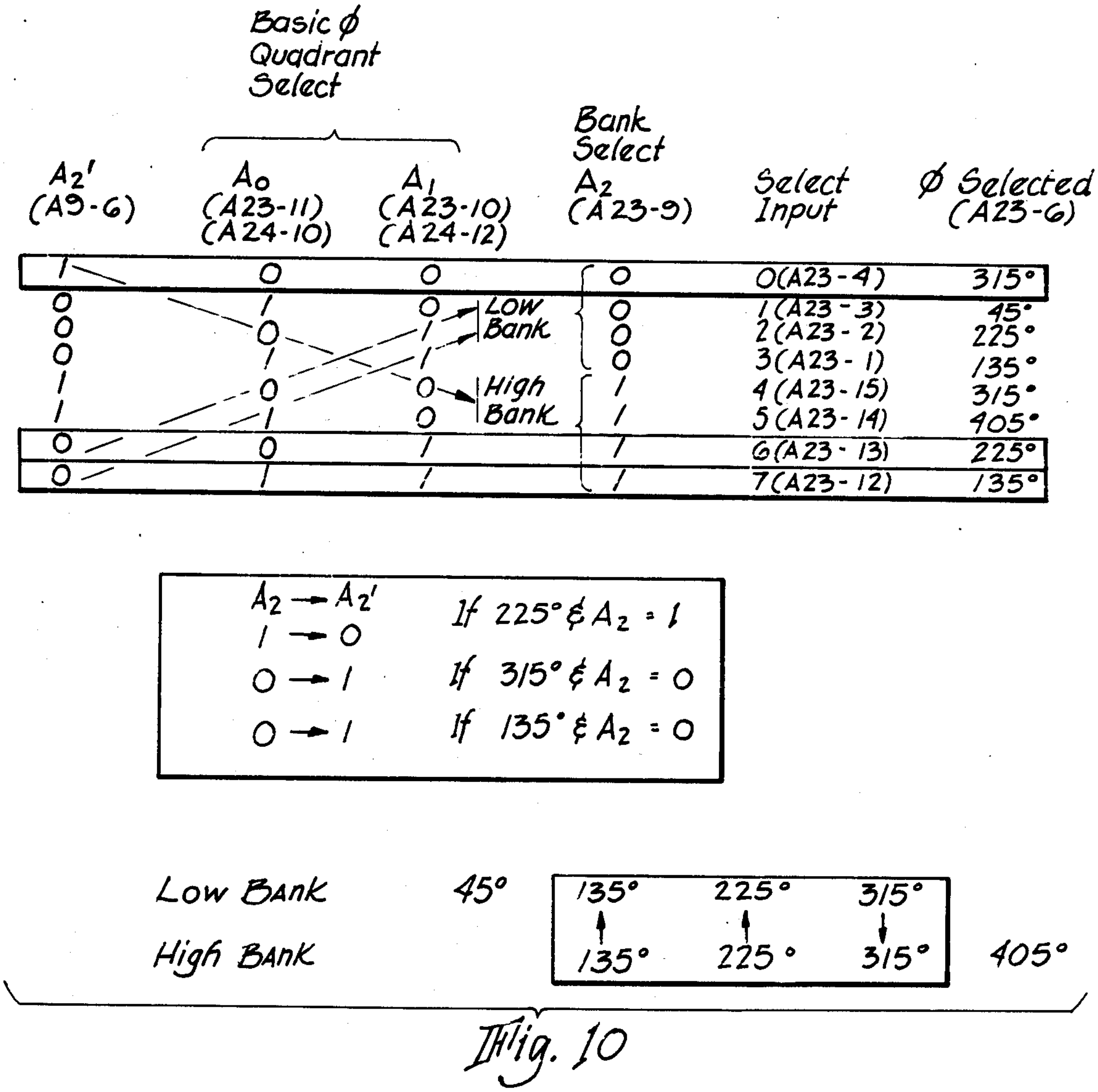

FIG. 10 is a truth table illustrating the operation of the coarse phase correction portion of the master clock/receive data absolute phase synchronization arrangement and method embodied in the illustrative embodiment of the invention.

BRIEF DESCRIPTION OF THE INVENTION

Briefly, in the preferred embodiment of a communication system 11 according to the invention, communication is permitted between any two nodes or stations 13 and their associated user devices UD such as data processing devices of any desired type, over any suitable available communication media 15, and which nodes are arranged sequentially in a continuous loop L. Each user device UD on the loop L may communicate directly with any other user device UD on the loop L by serial transmission and regeneration and retransmission from node 13 to node 13, including direct regeneration and retransmission after a one-bit delay at each retransmitting node along the loop.

At each node 13, conventional converter means may be employed such as a modem MOD in conjunction with a receiver RVC as may be necessary as the case may be in any given embodiment in practice of the invention, to translate the voltage-signal levels on the serial data loop to the standard TTL voltage levels required by the integrated circuits used in a communication controller 17 according to the preferred embodiment of the invention. It is advantageous to use differential voltages or other suitable techniques on the loop itself so as to minimize the effect of any noise or signal degradation due to the length or topography of the loop L. The output of the receiver RCV is passed to the data/clock synchronizer S(D/C), and the transmit output of the data/clock synchronizer S(D/C) is in turn passed to a driver DRV and modem converter means MOD as may be necessary or desirable for retranslation of the TTL format data back into the particular loop data format, after which it is passed back onto the loop for transmission along the loop media 15 to the next downstream node 13 and its associated user device or devices UD.

A data/clock synchronizer S(D/C) serves to recover master time-base used to generate the data presently being received. This recovered time-base or clock RC, otherwise also identified as receive clock, will be used to sample the incoming data R×D as well as to provide the time-base required by the synchronous data link controller (SDLC) of the instant node's communication controller 17, to regenerate and retransmit received data or to transmit new data onto the loop L, as well as to carry out its other node functions, if the node is acting as a slave node. Hence this data/clock synchronizer S(D/C) at each node 13 provides frequency synchronization with the next preceding "up-loop" or transmitting communication controller 17 and thus on backstream along the loop L to the loop node 13 serving as the instant master node 13(LM), which originates the time-base for the loop L. In recovering receive clock RC the data/clock synchronizer S(D/C) provides receive clock phase and frequency adjustment relative to receive data transitions, for loop timing stability when the slave node regenerates data or inserts new data onto the loop L.

The data/clock synchronizer S(D/C) also provides the highly important function of absolute phase synchronization of receive data R×D with a master time-base or master clock MC at the instant node 13LM acting as master time-base for the loop. This is a very important feature of this invention. Also, when a node 13 is acting as loop master time-base node 13LM, master clock synchronized receive data from the data/clock synchronizer S(D/C) is delayed a sufficient quantity of bit times to insure proper go-ahead character propagation on small-scale systems.

Each node communication controller 17 desirably employs a synchronous data link controller (SDLC) A25 to perform the complex interface function between serial data from and to the loop, and parallel data employed by the node user device UD, common memory CM, microprocessor MP, direct memory access controller DMAC, and microprocessor MP and associated program storage memory PM and scratchpad memory MM. An adapted SDLC format is utilized for data transmission. The SDLC A25 may provide flag detection and synchronization, zero insertion and deletion, frame check sequence generation and check and go-ahead detection and generation, according to standard protocol. Serial resynchronized data received from the loop is converted to an eight-bit parallel data format by this standard part, in accordance with its normal function. In addition, it provides the inverse function, i.e., converts eight-bit parallel data to serial data to be transmitted on the loop L.

A common memory CM is provided at each node 13 in which all data to be transmitted, and all data received, is stored. Data desired to be transmitted from the node user device UD to another node user device UD, as well as any data otherwise desired to be transmitted from a node onto the loop and to another node, is loaded in common memory CM. In the case of user device source data, this storage is effected via the user device interface UDI. This stored data is withdrawn from the memory by the SDLC A25 upon direction from a node microprocessor MP, and is then transmitted onto the loop at an open time. Conversely, data received by the SDLC A25 is stored in the node common memory CM and is read out of common memory CM to the node user device UD via the user device interface UDI. All data to and from the loop L stored in common memory CM is in the form of variable length packets.

To fully utilize the high data rate that can be accommodated by the loop L and the SDLC A25, it is desirable to read and write very quickly to the SDLC A25. A direct memory access controller (DMA Controller) DMAC performs the function of automatically transferring data between the SDLC A25 and the common memory CM at very high speeds.

As previously mentioned in the above discussion, at each node 13 there is a user device interface UDI which provides the proper timing and electrical interface to whatever node user device UD is used and which will be sending and receiving messages to and from the loop L and any given node user device UD.

Also as previously alluded to in the foregoing brief description, a node microprocessor MP program storage memory PM and scratchpad memory MM taken together form a small intelligent node controller to control the above-discussed node components as well as that of the overall node 13. In addition, the microprocessor MP may suitably format the data packets to be transmitted onto the loop L, and handles all error recovery, retransmission and acknowledgements.

Since all of the communication nodes 13 are connected together via a single continuous loop L, some method must be established for the orderly and controlled access to the loop for transmission of data D(L) along the loop L. Without such a scheme, multiple accesses could cause data collisions which would require exotic collision detection and recovery systems. In the illustrative embodiment and practice of the invention, a conventional recirculating go-ahead signal, delayed by one bit time at each node before retransmission, is employed to enable each communications device to sequentially access the loop. Constant monitoring of loop operation by each node 13 on the loop L insures regeneration and propagation of the go-ahead signal. The go-ahead signal consists of a binary zero followed by seven binary ones (01111111). Each device on the loop contains at least a one-bit time delay. This insures that the go-ahead on the loop L is received at a different time at each node 13. If the node 13 has nothing to transmit, it simply continues to regenerate or pass the go-ahead to the next down-loop node 13. On the other hand, if the node 13 wishes to access the loop L to send data, it will change the seventh binary one of the go-ahead to a binary zero, thus forming the SDLC flag or synch character (01111110) and thereby stopping propagation of the go-ahead to the succeeding down-loop nodes. At the conclusion of a transmission, the sending node reinserts the go-ahead on the loop L so that the sequence of passing the go-ahead for loop access can continue.

The system transmits and receives data in a format called a frame. All frames start with an opening flag and end with a closing flag. Between an opening flag and closing flag a frame (see FIG. 4) contains a destination address field, control field, source address field, information field and frame check sequence field. Of all the fields comprising a frame, only the information field is optional for adequate operation, with normal error detection.

The flag is the frame delimiter indicating the beginning and ending of a frame, and has a unique binary pattern of 01111110, as noted above. Flags provide frame synchronization and can, if desired, also be used for time-fill purposes when information data is not being transmitted on the loop L. This pattern cannot be allowed to occur anywhere within the other fields of a frame, as this would mistakenly be interpreted as a flag. All nodes 13 continually hunt for a flag alerting them to the beginning or ending of a frame. It if is a beginning flag, the next eight bits will be an address. If it is an ending flag, the station will know that the preceding 16-bit character was the frame check sequence character.

A frame is identifiable because it is bounded by flags and contains only nonflag bit patterns. This is not a restriction on a frame content, as a suitable standard protocol may be employed such that any time a continuous pattern of five ones is detected within a frame (between flags or a flag and a go-ahead) a zero is automatically inserted by the transmitting node. Thus, with such a protocol, no intraframe pattern of 01111110 is ever transmitted onto the loop. This standard protocol is known as the zero-bit insertion technique. The receiving node, after detecting the opening flag, restores the data to its original form by removing all zeros that follow a 011111 bit pattern. This zero-bit insertion gives the intraframe data complete transparency. The go-ahead is not affected by this technique since it is not between opening and closing flags.

The address fields contain the address of the source and destination stations. Since, in the illustrative embodiment, the address is an eight-bit character, up to 156 different addresses are allowed.

The control field is a multifunctional character that not only is responsible for the commands and responses which may be used on the loop L but also performs much of the bookkeeping chores needed. It defines the type of frame (information, supervisory), and may keep track of how many frames have been sent and received, and may issue commands and control information.

The most significant bit (bit 8) of the control field is a frame identifier bit and is used to distinguish between the two types of frames.

Software-generated counters of the node microprocessor MP may keep track of the number of frames sent (N(S)) and received (N(R)). These count numbers may be suitably included in all information frames. The transmitting station sequence count N(S) may indicate the frame number of the associated information frame. N(S) is incremented by the transmitting node or station 13 for each successive frame being sent and is only used in information frames. The receive sequence frame count N(R) may then identify the number of the next expected information frame to be received by the node. If a transmitted frame is not correctly received by the receiving node, the node's microprocessor may, through operation of its associated stored programs, inhibit the incrementing of N(R). Thus the N(R) may also confirm reception of all information frames to N(R)-1. The N(R) and N(S) counts may be used between two nodes 13 to indicate the number of sent and received frames by each. If a frame is lost by either of the nodes or incorrectly received, these counters may suitably indicate this situation, so corrective action can be taken at the direction of the relevant node microprocessor.

An information frame may be suitably distinguished by the first bit of the control field (bit 8) being equal to a binary zero. As noted above, this frame may also contain both the N(R) and N(S) counts. Both N(S) and N(R) software counters may be suitably set to zero on initialization and, therefore, zero may in such case be the identification number of the first frame sent. The microprocessor MP at the node or station 13 receiving information frames may check the N(S) count of the received frame with the N(R) count of the node or station 13. If the two counts are equal and no errors exist in the current frame, the frame may be accepted. The receiving node 13 then may increment its receive counter, indicating the number of the next frame to be received. If these numbers do not match, the receiving node 13 can then request a retransmission of frames beginning with frame N(R).

Supervisory frames may be used to acknowledge the receipt of error-free frames, to request retransmission of information frames, and to inhibit the sending of information frames. These frames have no information field and thus have no send sequence count N(S)). Neither N(S) nor N(R) are affected by supervisory frames. Supervisory frames may also be used to indicate to the sending station the reception of N(R) error-free frames. These frames may also be used for initializing station-to-station communication.

The information field may suitably contain the data to be transferred on the data link or loop. Supervisory frames do not contain information fields. Since it is code-independent, the information field is unrestricted as to its content and the zero-bit insertion technique may suitably give the field complete transparency to the data link control characters. The unrestricted range permits an information field of zero length. The length of the information field is normally limited by the system (e.g., the size of the node or station buffer).

A conventional frame check sequence is desirably contained in all frames. This 16-bit error-checking sequence precedes the closing flag. These 16 bits result from a mathematical computation on the binary value of all bits (excluding inserted zeros) within the frame (excluding flag) and is used to validate transmission accuracy. As is conventional practice, the transmitting node may, through the medium of its SDLC A25, perform the computation on the address, control, and information fields (if present), and attach the calculated 16-bit result before the closing flag, and send it out. The station or node SDLC performs the same computation on the incoming data stream and checks its calculated result with the frame check sequence sent by the transmitting station.

If a receiving node computation does not yield the proper check, it is assumed that the frame was received in error. Its entire content is suspect and is discarded. It is desirably the transmitter's responsibility to determine that the receiver has not accepted that frame, which may be effected by a suitable software routine in the microprocessor program memory at each node.

It will be appreciated that the foregoing brief description is merely illustrative as represented by a preferred and herein-described illustrative embodiment and method of practice of the invention, and other embodiments and forms of practice may be suitably employed within the ambit of the invention.

DETAILED DESCRIPTION

Referring now in detail to the Figures of the drawings, as shown particularly in FIGS. 1 and 2, a ring, loop or link serial data communication system 11 with any selected number of two or more nodes or stations 13, is provided, in which serial data D(L) in suitable form for transmission on the particular loop transmission media 15 (e.g., coax cable, twisted wire, fiber optic, etc.) proceeds serially from node 13 to node 13, until such data D(L) is removed by transmission of new data D(L) onto the loop by a given node 13.

At each node the loop data D(L) passes through a double-pole-double-throw loop switch LS which will either pass the loop data D(L) directly along the loop to the next node 13 if the particular instant node 13 is presently inoperable or not in operation for any reason, as indicated by absence or presence of a node on-line signal NOL from the node microprocessor MP, or will pass the loop data D(L) into the instant node 13 for processing and retransmission by the node 13 if the node microprocessor MP actuates the loop switch LS by sending a node on-line signal NOL to its associated loop switch LS.

At each on-line node 13 the loop serial data D(L) may be suitably converted from loop data form to conventional TTL form for processing by the communication controller 17 for each given node 13, as by a standard modem MOD and receiver/converter RCV, the output of which receiver/converter RCV will be the serial loop data D(L) in serial TTL form and which is subsequently referred to as raw received data RxD, or simply received data RxD. The particular form of modem MOD and/or receiver/converter RCV, and whether one or both are required for a given loop system 11, will depend upon the particular transmission media 15 and data D(L) transmission form (e.g., differential, TTL, etc.) employed on the given loop implementation of the invention.

The raw received data RxD is reclocked by the communication controller 17 through the medium of a data/clock synchronizer S(D/C), where it is reclocked to form recovered clock (or receive clock) receive data RxD(RC) and master clock receive data RxD(MC). One of either recovered clock receive data RxD(RC) or master clock receive data RxD(MC), dependent on the node's status as master or slave, is either passed to the Rx input of a standard synchronous data link controller (SDLC) A25, or is bypassed back to the loop by a single-pole double-throw SDLC on-line/bypass switch A68, through a suitable driver/converter DRV and the transmit section of modem MOD from which it proceeds back through loop switch LS and onto the loop, where it proceeds downstream to the next node 13, where the same activity takes place as described above.

Any one node 13 may serve as the master node 13LM for the loop in the data communication system 11, and all other nodes 13 will act as slave nodes for the period that the one node 13 acts as master 13LM. If the instant master node 13LM becomes inoperable (as indicated for instance by a dead-loop condition or absence of clocked data D(L) on the loop L, or by absence of a periodic message on the loop from the instant master node that it is the master and is in control), the instant on-line operational slave nodes 13 will detect this by their respective node microprocessor MP, which will, after a preselected suitably programmed time period, cause one of the slave nodes to change status to form the master node 13LM for the loop L. Each node microprocessor MP may be programmed with a suitably different time period for taking this action, so as to assure that only one node 13 will become the new master node 13LM. It will be appreciated that, once the new master node 13LM is switched to its master mode, all other nodes 13 will note this fact by the presence of a master-in-control message from the new master node 13LM. Such other prior slave nodes 13 will then continue their normal slave node operation.

At each on-line node 13, either the recovered clock receive data RxD(RC) or the master clock receive data RxD(MC) will be passed to the SDLC on-line/bypass switch A68 via a master/slave selector switch A18, dependent on whether this selector switch A18 is inactive or active, as determined by the absence or presence of a master select switch activating signal MS from the node microprocessor MP.

Concommitantly, the data/clock synchronizer S(D/C) generates and outputs recovered clock (receive clock) RC (in invert form $\overline{RC}$ in the instant illustrative embodiment) in absolute synch with recovered clock receive data RxD(RC) (through the medium of its receive clock recover/recovered clock receive data synchronizer (RC recover/RxD(RC) synchronizer) S(RC), and master clock MC (in invert form $\overline{MC}$ in the instant illustrative embodiment) (which master clock in the illustrated embodiment is effected through the medium of divide-by-forty divider D40 which is fed by the same crystal oscillator as feeds the RC recover/RxD(RC) synchronizer S(RC) for operation) with which the instant node 13 recovered clock receive data RxD(RC) has been sampled and resynched after a suitable phase shift by a master clock receive data synchronizer S(MC) (which also forms a part of data/clock synchronizer S(D/C)), to form master clock receive data RxD(MC). Thus, master/slave selector switch A18 presents either recovered clock receive data RxD(RC), together with receive clock $\overline{RC}$, or the instant node's master clock receive data RxD(MC) together with the instant node's master clock $\overline{MC}$, respectively to the input to SDLC on-line/bypass switch A68 and the clock input CLK of SDLC A25, dependent upon the normal slave node state or activated master node state of master/slave selector switch A18 as a function of absence or presence of an activating master select signal MS from the node's microprocessor MP.

The inactive state function of SDLC on-line/bypass switch A68 has been described above, by which the master/slave selector switch A18-selected one of recovered clock receive data RxD(RC) or master clock receive data RxD(MC) is routed around and bypasses the SDLC A25 and back out of the node 13 without any SDLC processing thereof. Upon the SDLC A25's being powered up and determining that it is operational, it will activate the SDLC on-line/bypass switch A68 through its LOC line output, thus routing the master/slave selector switch A18-selected data RxD(RC) or RxD(MC) into the SDLC A25 at its Rx input. This will enable the SDLC to act upon the instant selected recovered clock receive data RxD(RC) or master clock receive data RxD(MC), as the properly associated clock, (receive clock $\overline{RC}$ or master clock $\overline{MC}$) in synch with the selected clocked receive data RxD(RC) or RxD(MC), will have been selected and applied to the clock input CLK of the SDLC A25 through the medium of master/slave selector switch A18.

In the illustrative preferred embodiment, a standard SDLC A25 supplied by Motorola and designated as an "ADLC Controller" with the identification number MC6854 has been employed. For purposes of simplicity of further explanation, the standard functions and characteristics of this SDLC will be briefly set forth herein as follows:

1. Detect go-ahead:
   a. for initial insertion of its one-bit delay by activation of its LOC line to switch A68,
   b. for insertion of transmit data in normal operation;
2. Generate a go-ahead at completion of a transmit message;
3. Recognize an incoming flag for determination or beginning and end of receive messages;
4. Compute and append SDLC CRC check character for transmit messages;
5. Compute and check SDLC CRC check character for receive messages;
6. Provide parallel-to-serial conversion of data for transmit messages;
7. Provide serial-to-parallel conversion of data for receive messages;
8. Provide one-bit delay between receive data and retransmission as transmit data;
9. Modification of go-ahead to an opening flag for insertion of data onto the loop.

For specific operational connection or hook-up requirements internal functional circuitry, and operation, reference can readily be made to the published literature available from the manufacturer, Motorola, including a present Motorola handbook entitled "MC6854-ADLC An Introduction To Data Communication" published in 1978 by Motorola, Inc., and identified as M6854UM(AD) (70 pages), in which this item is described in technical detail for circuit implementation by circuit designers skilled in the art.

It will be appreciated that, while the employment of the SDLC A25 is particularly facile and much to be preferred by way of simplicity of implementation, as well as being most cost-effective and readily available, if so desired, various ones or all of these listed functions may be handled with an on-board microprocessor MP and/or other suitable hardware, firmware and/or software devices. The use of the composite SDLC chip device A25 merely simplifies what otherwise requires additional computational implementation hardware, firmware, and/or software.

Other standard SDLC's from other sources include an "SDLC", WD-1933, from Western Digital, a "Serial Data/Output Controller", Z80-SIO, from Zilog, and a "Programmable HDLC/SDLC Protocol Converter", #8273, from Intel. These additional SDLC's are understood to have the same basic characteristics as the Motorola SDLC, MC6854, although each may differ in various protocol and functional aspects, such as required phase input relations, detailed protocol, and reference may be made to the respective detailed published technical manufacturer's handbooks and other manufacturers' published literature for specific operating characteristics of each.

It will be appreciated that the SDLC requirement for serial input data input thereto to be in synch with clock input thereto is met by both the recovered clock receive data RxD(RC) with its associated receive clock RC (in inverted form $\overline{RC}$ in the instant illustrative embodiment employing a Motorola MC6854 as the SDLC 25) and by the master clock receive data RxD(MC) with its associated master clock MC (in inverted form $\overline{MC}$ in the instant illustrative embodiment). The operation of the data clock synchronizer S(D/C) to effect this necessary clock synched input to the SDLC A25 for both the normal slave mode and the selected master mode, for each node 13 forms an important feature of this invention, and will be later described in further detail.

If the master/slave selector switch A18 is in its normal slave mode the recovered clock receive data RxD(RC) will pass into and be retransmitted by the SDLC A25 after insertion of a one-bit delay, which is necessary in order to enable each node to have access to the loop upon receipt of a control from the loop, which control token is subsequently described as a go-ahead. In any event, all data received from the loop will be either passed back onto the loop without any one-bit delay (if SDLC on-line/bypass switch A78 is inactive) or will be retransmitted by SDLC A25 with a one-bit delay (if SDLC on-line/bypass switch A68 is activated by its associated SDLC A25), except for the case where a go-ahead is received and the SDLC has been preinstructed by the node 13 microprocessor MP that data is in the node common memory CM and is desired to be transmitted to another node 13 on the loop.

Upon the receipt of a go-ahead from the loop in that instance, the SDLC A25 will, in its normally selected loop mode of operation (which normal mode is selected by the microprocessor MP for normal operation of the system 11), change the last bit of the go-ahead character (01111111) to a zero to thereby form a flag or synch character (01111110), which will effectively remove the go-ahead from the loop and will prevent the downstream nodes 13 and all subseqeunt nodes 13 from having self-transmit access to the loop L until this presently accessed node 13 has completed transmission of its desired data message.

At the conclusion of the transmission by the instant loop-accessed node 13, the node's SDLC A25 will reinsert a go-ahead onto the loop L. The activity of the SDLC A25 is standard in this respect and will not further be described.

The switch A18-selected properly synched receive data RxD(RC) or RxD(MC) is converted by the SDLC A25 from serial-bit form suitable for processing by the data/clock synchronizer S(D/C) on the serial data side of the SDLC A25, into parallel bit form (e.g., eight-bit parallel bytes) suitable for processing by the various components on the parallel data side of the SDLC A25. The serial data components are basically a microprocessor MP for controlling intranode activity, an associated microprocessor program memory PM which may suitably be embodied in a standard PROM device, a common data memory or common memory CM for storing and accessing received data and data desired to be transmitted onto the loop by the particular node 13 of which it forms a part, a user device UD such as a host computer, host microprocessor, machine, or the like which is the addressed user unit at the given node, together with an appropriate user device interface UDI for accommodation of the particular user device UD with the common data memory CM.

The data frame format employed in the illustrative embodiment is shown in FIG. 4, and is very similar to the standard SDLC format, differing only in the addition of a second address field instead of a single address field in the standard SDLC protocol format. This can be simply accomplished by suitably programming the microprocessor's program memory PM, such that the microprocessor MP will be programmed to recognize and process the first address field after the opening flag as the destination address, and the appropriate number of initial bits (e.g., the first eight bits in the illustrative example employing eight-bit address characters) in what would be the beginning of the information field according to standard SDLC practice, as the message source address.

In the conventional prior art SDLC utilization and practice, a single fixed master node is used, and as all slave nodes communicate only with the master, only a single address suffices for recognition as a message source address for messages received by the master and as a destination address at the various slave nodes for messages from the master to a given slave node. For slave-to-slave data transfer, the data packets need first be sent to the master node where the messages are taken off the loop, interpreted, reformatted and transmitted as new packets addressed to the second slave node. This requires full message removal, reformatting and a new transmission by the master node, which is time-consuming and inefficient. In the present dual slave/master node communication system 11, each message packet identifies both source and destination addresses at respective locations within each loop data frame, and the messages are sequentially retransmitted around the entire loop L by all nodes 13, irrespective of whether a node is acting as the instant time-base master node 13LM or is acting as a slave node 13. Thus, no reformatting at any retransmitting node 13 is necessary, and all nodes recognize both the destination and source address fields as such and act on and process the packets or frames accordingly.

As is standard SDLC packet frame format, and has been discussed at some length earlier in the description, each frame has a control field which may be utilized for various purposes, such as message sent/received correlation and checking between nodes and indication of the type of information field which will follow.

The information field may carry any data desired to be transmitted to another node, and is expandable within limits within the standard SDLC protocol. Following the information field is a frame check sequence field, for error checking through use of a conventional CRC character, followed by either a flag or synch character (if the node 13 has further data to be transmitted from its common data memory CM in the next-succeeding packet frame) or by a go-ahead character (if the microprocessor MP has indicated to the SDLC A25 that this particular data packet frame will complete its data then in the node 13 common data memory CM and desired to be transmitted to another node 13).

The next succeeding node 13 downstream will next receive the go-ahead, its SDLC A25 will recognize it, and this next node 13 will have access to the loop upon this recognition being noted by its associated SDLC A25. The operation will thus continue around the loop L, and all serial data D(L) on the loop L will continue to circulate without harm, until it is removed by the act of a given node taking transmit access control of the loop L and transmitting a message onto the loop L, at which time the following serial data D(L) flowing into the instant transmit-accessed node 13 will drop off the loop L at this node 13 through its failure to be retransmitted by the instant self-transmitting transmit-accessed node 13. Thus, if the transmitted data packet frame or frames contains more bits than the number of nodes 13 which are on-line on the loop L, it will be appreciated that the front end of the transmitted frame or frames from the source node 13 will arrive back at the source node 13 before completion of the full transmission by this node 13, and will drop off after entering its SDLC A25 and being restored in its common data memory CM for comparison or other desired processing by the microprocessor MP.

In the case of very small loops L with less nodes 13 than the number of bits in a go-ahead, it is necessary to provide sufficient storage in the loop L to enable a full go-ahead to be present along the loop L when such is transmitted or retransmitted by any given node or nodes 13. This is accomplished in the instant master node 13LM by insertion of an eight-bit delay in the master clock receive data RxD(MC) through the medium of an eight-bit shift register A16, the first stage of which also serves to effectively sample coarse phase-shifted recovered clock receive data RxD(RC+SEL $\phi$) with master clock MC to thereby provide master clock receive data RxD(MC) in absolute phase synch with master clock MC and $\overline{MC}$ of this instant master node 13LM.

After passing through the full eight-bit shift register A16, the resultant master clock receive data RxD(MC) is not only in absolute synch with master clock MC and $\overline{MC}$ of this master node 13LM, but is also delayed eight bits relative to the recovered clock receive data RxD(RC), thereby ensuring that the loop L will have sufficient capacity to hold and propagate a full go-ahead character around the loop L, even if the loop L only contains two nodes 13.

Each data/clock synchronizer S(D/C) at each master/slave node 13 includes an RC recover RxD synchronizer S(RC) which recovers receive clock and synchronizes the receive data RxD with recovered clock RC to form recovered clock receive data RxD(RC), and an RxD(MC) synchronizer S(MC) which synchronizes receive data RxD with the master clock MC generated at the respective master/slave node 13, to thereby form master clock receive data RxD(MC).

In the illustrative embodiment a 40 mhz output of a single crystal oscillator CO (any other desired and suitable frequency, or time source, may be employed, as may be desired) at each node 13 forms the input to each of RC recover/RxD(RC) synchronizer S(RC) and RxD(MC) synchronizer S(MC). The crystal oscillators CO at each of the respective nodes have the same nominal frequency (e.g., 40 mhz) but, due to normal manufacturing tolerances, each oscillator CO may be expected to vary slightly from the nominal frequency. It will be appreciated that the frequency variation tolerance should preferably be as low as economically and practically possible.

In forming recovered clock at each node 13, it is necessary to accommodate both the inherent slight frequency differences between the on-board oscillators CO at the various nodes 13 and the phase shifts of D(L) as it propagates along the loop L, and thus of the incoming raw receive data RxD at each node 13, which phase difference may result from both the slightly different frequency crystal oscillators CO at the various nodes 13 as well as from the phase delays introduced along the loop L. To this end, each RC recover/RxD(RC) synchronizer S(RC) includes a variable divide counter (which in the illustrative embodiment is a variable divide-by-forty counter) VD40 fed by the respective onboard crystal oscillator CO 40 mhz output.

Briefly stated, the RC recover/RxD(RC) synchronizer S(RC) recovers receive clock RC by varying the divide or count operation of variable divide-by-forty counter VD40 as a function of whether receive data RxD transitions are early or late relative to the 1 mhz output of the variable counter VD40. After a very brief startup period, during which its clock output $\overline{RC}$ will be corrected toward synchronism with the receive data and thus with the frequency of the master clock $\overline{MC}$ from the instant master node 13LM, the output of the variable divide-by-forty divider VD40 will be slaved in synchronous frequency and phase to the receive data RxD, and will thus form recovered clock RC in effective frequency synchronism with the instant loop master clock MC(L) for data D(L) on the loop, which loop master clock MC(L) is formed by the on-board-generated master clock MC at the master/slave node 13 acting as the instant master node 13LM for the entire loop communication system 11.

At this point it is noted that in the present description, the terms "master clock" and "recovered clock" or "receive clock" include both the positive form of each such clock, designated respectively in the illustrative embodiment and mode of practice, by the reference characters MC and RC, and the negative or invert form thereof, which in turn is designated respectively by the reference characters $\overline{MC}$ and $\overline{RC}$.

A designator convention has been adopted for clarity of explanation in this specification under which the form of each of master clock and recovered clock which has its positive or rising edge beginning at count zero of the respective counters D40 and VD 40 is designated as MC and RC respectively, while the invert form having its leading edge at count zero thereof is designated by $\overline{MC}$ and $\overline{RC}$, respectively.

Likewise, according to this convention, any harmonic frequency form of master clock and recovered clock or receive clock which has a positive or rising edge beginning at count zero for the respective divide-by-forty clock counter D40 and VD40 is referred in the same manner as above (e.g., RC2 for the 2 mhz positive form of recovered clock), while the invert form which has a negative or falling edge beginning at count zero is referred to with the bar designation (e.g. $\overline{RC4}$ for the invert form of 4 mhz recovered clock).

The receive data RxD at each node 13 is center-bit sampled in the RC recover/RxD(RC) synchronizer S(RC), which yields recovered clock receive data RxD(RC) in perfect synchronism with recovered clock RC.

As above noted, after an initial startup catch-up period, the recovered clock 13 at each node 13 will be slaved to effective frequency synchronism with the instant loop master clock MC(L) formed by the master clock MC originating at the instant node 13 acting as loop master 13LM and providing the loop time-base or master clock MC(L). Thus, the recovered clock receive data RxD(RC) formed by center-bit sampling of receive data RxD at each node 13 will be in effective frequency synchronism with the loop instant master clock MC(L).

However, as the phase of the receive data RxD, and concomitantly the recovered clock receive data RxD(RC), will be indefinite relative to the phase of instant loop master clock MC(L) at the instant loop master node 13LM, in order to be able to effectively and reliably sample the receive data with the master clock MC at the loop master node 13LM (or, for that matter, with the on-board master clock MC generated at any of the master/slave nodes 13) it is necessary to determine and adjust for the phase differences between the receive data to be sampled and the node on-board master clock MC at the instant loop master node 13LM (which action is also carried out on a continuing standby basis at all of the remaining loop nodes 13 on the loop in the illustrated and preferred embodiment and mode of practice of the invention, in order that all nodes 13 may facilely serve as master node substitutes or backups for the overall loop communication system 11).

This phase difference determination and adjustment is effected in the RxD(MC) synchronizer S(MC), by first detecting the extent of any phase differences between recovered clock RC and the on-board master clock MC (which at the instant loop master node 13LM forms the loop time-base or loop master clock MC(L)). The loop master clock designator MC(L) is not shown on the drawings, as the drawings show the details for any single dual master/slave node 13, which has the continuing dual capability of serving as loop master node or slave node, and thus the master clock MC at any one node may become the loop master clock MC(L) simply by switching the master clock MC at any such node 13 onto the loop, together with its respective master clock receive data RxD(MC). Thus, loop master clock MC(L) is merely the on-board master clock MC originating at any given dual master/slave node 13 which is at the instant time acting as the loop master node 13LM.

As generally shown in FIGS. 3A and 3B, and more particularly shown in FIGS. 5A-5C, at each node 13 in the illustrative embodiment, the RxD(MC) synchronizer S(MC) effects absolute synchronization of its on-board master clock MC with an effectively sampled form of receive data RxD by sampling recovered clock receive data RxD(RC+SEL $\phi$) which has been phase-shifted by an amount SEL $\phi$ sufficient to enable effective sampling thereof by the on-board master clock MC, which phase shift amount SEL $\phi$ is a function of the phase difference between recovered clock RC and on-board master clock MC as detected by the RxD(MC) synchronizer S(MC).

As previously noted, each of the master/slave nodes 13 has the dual capacity of acting as either master node or slave node. In the present illustrative and preferred embodiment, each instant slave node is maintained in a ready standby condition and, to this end, all nodes 13 carry out on a continuing dual basis substantially all of the same receive clock recovery data/clock synchronization to provide on-board recovered clock RC, recovered clock receive data sampling to provide RxD(RC), and the detection of phase difference between recovered clock RC and on-board master clock MC, provision of a phase-shifted form of recovered clock receive data RxD(RC+SEL $\phi$) which has a phase shift which is a function of detected phase relationship between recovered clock RC and on-board master clock MC, and the amount of which phase shift is sufficient to enable effective and reliable sampling by master clock MC.

At the instant dual master/slave node 13 acting as loop master node 13LM to provide loop master clock MC(L), the actual sampling of the suitably phase-shifted recovered clock receive data RxD(RC+SEL $\phi$) is effected, thereby forming master clock receive data RxD(MC) which is in absolute phase synchronism with loop master clock MC(L) formed by the on-board master clock MC of this instant loop master node 13LM. Since, as previously noted, this on-board master clock is also the loop master node 13LM, the recovered clock RC at this node will be in effective frequency synchronism with the on-board master clock MC generated at this loop master node 13LM, as all other nodes 13 on the loop are effectively slaved to this loop master node's on-board-generated master clock MC which forms the instant loop master clock MC(L).

It is thus only necessary to correct for phase differences between the on-board master clock MC at the instant loop master node 13LM and the receive data RxD (as reflected by recovered clock RC) in order to enable continuing effecting sampling of recieve data by master clock MC to form master clock recieve data RxD(MC) for inputting to the associated SDLC A25 through its associated master/slave selector switch A18 at the instant loop master node 13LM. And this phase correction of receive data relative to the node's own master clock MC, $\overline{MC}$ is effected as noted above by the on-board RxD(MC) synchronizer S(MC) for all nodes 13, including the instant loop master node 13LM.

The sampling of selected phase-shifted recovered clock receive data RxD(RC+SEL 0) by on-board master clock MC (loop master clock MC(L) at the instant loop master node 13LM) is effected by the first stage of an eight-bit shift register A16 (when activated by the microprocessor MP in the illustrative and preferred embodiment) which serves also to insert an eight-bit delay in the transmission therefrom of the master clock-sampled data RxD(MC) appearing at its output and feeding master/slave selector switch A18—14 (i.e., contact 14 of master/slave selector switch 18). The eight-bit shift register A16 thereby provides an extra eight-bit storage for loop data D(L). The eight-bit delay, with its concomitant effective eight-bit added storage, provided by eight-bit shift register A16 at the node 13 acting as instant loop master node 13LM guarantees sufficient loop storage capacity to accommodate the eight-bit go-ahead character for loop communication systems 11 of smaller than eight nodes 13, and which may be as few as two nodes 13, one of which will act as instant loop master node 13LM and will also provide the indicated eight-bit delay and necessary loop data D(L) storage capacity to accommodate effective go-ahead propagation around the loop L.

While all nodes 13 can also carry out this master clock MC sampling of selected phase-shifted recovered clock receive data RxD(RC+SEL $\phi$) (since selector switch A18 serves to prevent transmission of the resulting output master clock receive data RxD(MC) at all nodes except the instant loop master code 13LM), in the illustrated and preferred embodiment and mode of practice of the invention, only the instant loop master node 13LM has its eight-bit shift register A16 enabled by the on-board microprocessor MP to perform the sampling of master clock receive data RxD(MC), in order to prevent the accumulation in shift register A16 and the initial retransmission by the new loop master mode 13LM of any meaningless garbage data D(L) appearing on the loop L immediately prior to any master/slave node 13 assuming the role of loop master node 13LM.

As previously noted, the master/slave selector switch A18, which is in turn controlled by on-board microprocessor MP, effects selection of one or the other of alternate master mode inputs RxD(MC) and $\overline{MC}$) and slave mode inputs (RxD(RC) and $\overline{RC}$) of data and clock thereto, dependent upon the instant determination made by the microprocessor MP in accordance with its program of searching for absence of data and flags, go-aheads, and periodic master-in-control messages (which may suitably be represented by a special address character recognized by the microprocessor MP program in each node's microprocessor program memory PM) on the loop, for a period of time exceeding a preselected programmed period of time for each node 13. This varied period of time for each node (which period of time may, if desired, be suitably varied according to the numerical addresses [which may be sequential for the nodes 13 along the loop L, or may be random if desired]), and which period of time normally (but not necessarily, as noted) will be larger at each succeeding down-loop node 13, is sufficiently different between nodes 13 to enable any one node 13 to effectively generate the master control signal from its on-board microprocessor MP and thereby to switch master slave selector switch A18 from slave to master state, thereby closing switch A18 from its normally open slave state. Normally closed master/slave selector switch A18 contacts 5 and 14 are thereby opened and its normally open contacts 6 and 13 are closed, to effect breaking of connection of the recovered clock receive data RxD(RC) and its associated recovered clock $\overline{RC}$, to the SDLC A25 respective data inputs Rx and CLK(Rx and Tx), and also effecting connection of master clock receive data RxD(MC) and its associated master clock $\overline{MC}$ to the respective data input Rx and clock inputs CLK(Rx and Tx) of SDLC A25. The master control select signal MS from the new loop master node's microprocessor MP may also be suitably connected to the enable pin 9 (see FIG. 5C) of the eight-bit shift register A16 to thereby enable it to begin operation and begin shifting master clock receive data RxD(MC) therethrough and out to master select switch A18 which, as previously noted, will now be in the loop master state and will thereby connect the master clock receive data RxD(MC), together with on-board-generated master clock $\overline{MC}$, to the SDLC A25.

The microprocessor MP at each of the nodes 13 may be suitably programmed such that for all other nodes 13 not counting down to their master control signal initiation stage, each such node 13 will abort its master control initiate count-down program upon noting the presence of a master on the loop, as by the presence of a go-ahead, data, or flags, and an initial loop master-in-control message automatically placed on the loop (and periodically thereafter) by the new master node 13LM as a part of the loop master node program stored in the microprocessor MP program memory PROM MM for each node 13. To also handle the very rare possibility that two nodes 13 may nevertheless each successfully count down and initiate a master control signal, the microprocessor MP at each node 13 may also be programmed to simply cease its master node state if a signal is received which indicates that another node 13 of lower address has already assumed the loop master node state and is operating in this state. In this respect, as previously noted, all node addresses may be either sequentially or randomly assigned, so long as each node has a distinctively, numbered or other numerically equivalent address, as the node locations along the loop are of no consequence in this respect.

Also, for all other nodes 13 remaining on the loop, which now assume or continue their role as slave nodes, the master/slave selector switch A18 remains in the slave mode, thus connecting recovered clock receive data RxD(RC) and associated recovered clock $\overline{RC}$ to the respective data input Rx and Clock inputs CLK (Rx and Tx) for processing by the SDLC A25. As the SDLC A25 (i.e., Motorola ADLC, MC6854) which is employed in the illustrated embodiment and mode of practice internally samples incoming data Rx with incoming clock CLK on the positive or rising edge of clock, the invert form of master clock $\overline{MC}$ and recovered clock $\overline{RC}$ is supplied at master/slave selector switch A18 terminals or pins 6 and 5, respectively. This supply of the inverted form of each of master clock $\overline{MC}$ and recovered clock $\overline{RC}$ as inputs to master/slave selector switch A18 accompanies respectively master clock receive data RxD(MC) and recovered clock receive data RxD(RC) (at master/slave selector switch A18, pins 13 and 14) which, it will be noted, is data clocked respectively by the positive form of master clock and receive clock, as indicated by the respective MC and RC designators, and as will be more appreciated and understood from the subsequent description of the detailed drawings of FIGS. 5A, 5B and 5C and operation of the circuitry shown thereby.

Referring again to FIG. 2, the selected data/clock pair of each of reclocked receive data RxD($\overline{MC}$) or RxD($\overline{RC}$) data and clock ($\overline{MC}$ or $\overline{RC}$) inputted through master/slave selector switch A18 will, at each node 13 communication controller 17, be processed by its respective SDLC A25 in the same manner, irrespective of whether the node is acting as a slave node 13 or as the instant loop master node 13LM. The microprocessor MP at the loop master node 13LM may activate a suitably different program routine from its normal slave program routine to enable the instant loop master node 13LM to assume and carry out its necessary loop control functions, which are generally to a substantial degree optional except for the necessary functions of activating the normally inactive eight-bit shift register A16 and switching master/slave select switch A18 from its normal slave state to its master state, and the software programmed function or routine of sending out periodic loop master-in-control messages, as a function of the selected program set into each master/slave node 13. Of course, any desired loop housekeeping or control tasks may be suitably programmed into the loop master program routine for respective microprocessor MP at each of the dual master/slave nodes 13. Fundamentally, however, the primary and most critical functions of the instant loop master node 13LM are to supply time-base or master clock MC(L) for all of the data D(L) on the loop L and, as a vitally critical concomitant additional function, the absolute phase correction or received data into absolute synchronism with its on-board-generated master clock MC, and which is serving as the instant loop time-base or master clock MC(L). Both of these critically important functions have been broadly described with reference to FIGS. 1 and 2, and will be subsequently described in more detail in referring to FIGS. 3A and 3B, and FIGS. 5A, 5B, and 5C.

In addition to timing out a loop master control-initiate software routine, each loop node 13 may suitably have its microprocessor MP programmed to momentarily cause the generation and transmission onto the loop L of a continuous one state by the node 13 upon detection for a selected extended period of a dead- or zero-state loop L. Such selected short period should, of course, be materially shorter than the shortest time period programmed into each node microprocessor MP for effecting initiation of its master control signal MS and any other desired master node routine and/or function or operation. This generation of continuous ones onto a dead loop by a given node 13 may be effected by merely having its microprocessor MP switch the SDLC A25 of the node's communication controller 17 from its normally maintained loop mode to a point-to-point mode, in which the SDLC automatically generates and trasmits a steady one state. The loop will be effectively broken during this brief point-to-point mode state of the SDLC at this node 13. This brief burst of a steady one state by a given node 13, whether master or slave, will enable the next following downstream node 13 to detect the one state as a steady stream of ones which will result in this downstream node's go ahead detector and regenerator GAD automatically inserting a zero into the data stream for the next bit after detection of a preselected number of successive ones (e.g. after 8 successive ones in the illustrative embodiment, which is sufficient count to assure that no go ahead is present), to thereby create a go-ahead in the data stream which it transmits onto the loop.

Referring further to FIG. 2, the ADLC A25 at each node 13 takes the particular data inputted at its Rx input and the associated clock inputted at its Rx and Tx Clk inputs and carries out its routine of various functions as previously briefly described, and as is described in full detail in the referenced Motorola handbook for the Motorola SDLC (i.e., Motorola ADLC MC6854) used in the present illustrative embodiment and mode of practice of the invention.

Thus, the SDLC A25 converts the serial data RxD(RC or RxD(MC) inputted by master/slave selector switch A18 at its Rx inputs into parallel data form, which may suitably be arranged in eight-bit parallel bytes or other particular desired and suitable parallel byte length consistent with the operation of the particular chosen SDLC A25 or other serial to parallel to serial data converter which may be employed for this function.

High-speed transfer of data between the SDLC A25 and common memory CM may be facilely accomplished simply by enabling the DMA (direct memory access) controller DMAC to have transmit access to the common data bus CDB in accordance with standard data transfer practice via a common data bus CDB.

A conventional bus arbitrator and respective three-state transceiver 3STM and 3STU together with respective three-state drivers 3SDM and 3SDU provide a suitable interface for communication via the common data bus CDB to and from the microprocessor MP and to and from the particular node user device UD, and to and from the common memory CM and to the DMA controller, all under the bus access control of the bus arbitrator BA. The microprocessor MP may directly communicate over separate direct connections with its associated program memory PM and its scratchpad RAM memory MM. In addition, the microprocessor MP suitably controls the various serial data handling switches under its control on a direct connection basis, as shown, including loop switch LS and master/slave selector switch A18. It will be appreciated that the user device UD views the entire associated node components, as well as the entire loop, as merely memory for the user device UD, and it addresses other user devices UD at other nodes 13 as if they are simply memory addresses.

The microprocessor MP formats and frames the data in the common memory into packets suitable for transmission onto the loop, including forming and locating the proper destination and source addresses, and gives the SDLC A25 a command that data is available in common memory CM and destined for another node 13 address. The SDLC A25 will then access the loop on detection of the next go-ahead, whereupon it will automatically change the go-ahead to a flag or synch character and will then commence transmittal of data packets onto the loop as the data packets are transferred to the SDLC from common memory CM by the DMA comtroller DMAC. The SDLC A25 automatically adds the necessary flags at the beginning and between its successive message frames, and adds the ultimate go-ahead character at the end of its transmission, as well as performing the check character formation and checking activity for all transmitted and received messages.

The particular illustrated form of the parallel data side, with its associated mode of operation, is merely by way of illustrative example, and may be varied or altered at the option of the systems user. The systems user may orchestrate this parallel data handling side of any node 13 with any suitable apparatus and/or software which the system user has available and/or desires to use for a given purpose and situation, consistent with the mode of operation of the particular SDLC A25 or other equivalent serial/parallel data conversion apparatus and/or software which may be used for any or all of the SDLC A25 functions. As this particular portion of the nodes 13 is standard and broadly optional in content with the system user, it will not be further described herein.

Referring now more specifically to FIGS. 3A and 3B, the receive cock recover/RxD(RC) synchronizer S(RC) includes a variable divide-by-forty counter VD40, having a stable 40 mhz input signal supplied by a crystal oscillator CO which also feeds a conventional divide-by-forty counter D40, whose outputs 1 and 2 form respectively master clock MC and $\overline{MC}$.

The variable divide-by-forty counter VD40 comprises a variable divide-by-four/five/six counter section designated as VD4/5/6, followed by a divide-by-eight counter section designated as D8. The variable divide-by-four/five/six counter section VD4/5/6 is selectively controlled by selectively inhibiting the normal divide-by-five count sequence of the divide-by-four/five/six counter VD4/5/6 through disabling of the divide-by-five enable line, while selectively enabling either of the alternate divide-by-four or divide-by-six count sequences as a function of the signal state applied to the divide-by-four/six input control line to this variable divide-by-four/five/six counter section D4/5/6 as a function of the then present early/late error-sense signal ES.

The gating control logic GCL is also provided with a distinctive input from the overall variable divide-by-forty counter VD40 on the last count of the divide-by-forty count (i.e., count 39 of a zero through 39 count).

The clock update signal CU is formed as a function of detection by change detector A31A of the occurrence of a data transition in incoming raw received data RxD from the modem MOD and receiver/converter RCV.

The divide-by-four or divide-by-six enable state of the error-sense signal ES is a function of the comparison by difference detector A31B of the respective result RxD($\overline{RC}$) of sampling of raw received data RxD at flip-flop A33B with the 1 mhz invert form of the clock output $\overline{RC}$ from variable divide-by-forty counter VD40 relative to the result RxD(RC) of the 180° later sampling of the raw receive data RxD at flip-flop A33A with the positive form of the 1 mhz clock output RC from variable divide-by-forty counter VD40. This comparison provides an absolute error sense indication of either an early or a late data transition of raw receive data relative to the present recovered clock RC. The divide-by-five count section will be disabled for its normal divide-by-five sequence only upon the occurrence of the terminal count (i.e., 39) state in counter VD40 (with a corresponding output indicative thereof to gate control logic GCL concurrent with a clock update signal CU from the change detector A31A reflecting the occurrence of a data transition in raw received data RxD.

The clock update signal CU is formed as a function of comparison of the reclocked receive data RxD(RC) with the raw receive data RxD which will reflect any concurrent difference in state of raw receive data RxD and reclocked receive data RxD(RC).

Any out-of-phase condition of raw receive data RxD relative to reclocked receive data RxD(RC) will result in a clock update signal CU from change detector A31A upon the occurrence of a data transition, which clock update signal will always overlap a count-39 state in variable divide-by-forty counter clock VD40.

Only when the divide-by-five sequence is disabled at count 39 by a disable state signal from control logic GCL is the divide-by-four/six select line effective to cause division by either four or six during the single count period at count 39. If the divide-by-five is disabled at count 39 by presence of a clock update CU, the variable counter clock VD40 will be caused to either gain or lose dependent on the high or low state of the divide-by-four/six enable line from gate control logic GCL, which in turn is a function of the error-sense signal ES present on the output from difference detector or comparator E31B.

As a result, the count of variable counter VD40 will change for one count period at count 39 from a normal count 39-0-1-2 sequence (when a normal divide-by-five enable state is present on divide-by-five enable line) to either a shortened 39-1-2-3 count sequence (divide-by-four), (divide-by-39) when divide-by-five is disabled and divide-by-four enable state is present on divide-by-four/six enable line) or a lengthened 39-40-1-2-3 count sequence (divide-by-six), (divide-by-41) when divide-by-five is disabled and divide-by-six enable state is present on divide-by-four/six enable line). Thus the variable divide-by-forty counter VD40 clock output will be on one of a normal constant 40-count cycle (if no raw receive data RxD transition occurs), a shortened 39-count cycle or a lengthened 41-count cycle (for each clock cycle when raw received data RxD transitions have occurred). The shortened 39-count sequence will effectively speed up the clock output $\overline{RC}$ from variable divide-by-forty counter VD40 by 25 nanoseconds per shortened count sequence and the lengthened 41-count sequence will slow down the clock $\overline{RC}$ by 25 nanoseconds per lengthened count sequence clock output $\overline{RC}$. The clock $\overline{RC}$ appearing at the output of variable divide-by-forty counter VD40 will thus be varied toward frequency and phase synchronism, and, after a brief startup period of catch-up operation during which the variable count forming clock $\overline{RC}$ may be varied in one direction to bring the clock $\overline{RC}$ into frequency and phase synchronism by less than one count period (25 nanoseconds), the clock $\overline{RC}$ formed by ariable divide-by-forty counter VD40 will effectively slave in synchronism with raw receive data RxD, being continually updated at each data transition of raw receive data RxD. It will be appreciated that the initial catch-up will require a maximum of 20 data transitions to enable full-slaved synchronism of the clock output $\overline{RC}$ with the raw received data RxD, as the maximum initial out-of-phase condition is 500 nanoseconds, and each correction of $\overline{RC}$ is by a 25 nanosecond amount.

Thus, the clock output $\overline{RC}$ effectively forms recovered receive clock $\overline{RC}$, or simply recovered clock or receive clock, and is so termed herein.

As will be next discussed at length, and as shown in FIG. 7 this recovered receive clock output $\overline{RC}$ from variable divide-by-40 count VDO goes negative (i.e. from high to low) at count zero of the variable divide-by-forty counter VD40 employed in the present illustrative embodiment and mode of practice, and accordingly is termed as $\overline{RC}$ in accordance with the nomenclature convention adopted for this description. The inverted form of $\overline{RC}$ is the positive form of recovered receive clock RC, having its positive edge at count zero of the variable divide-by-forty counter VD40. Since the invert form of recovered clock $\overline{RC}$ output from variable counter VD40 is slave-synched with the raw received data, the positive form of recovered clock RC will be effectively 180° out-of-phase, thus enabling reliable center-bit sampling of raw receive data RxD by recovered clock at flip-flop 33A to form recovered clock receive data RxD (RC), which is routed to one of the slave clock input terminals 14 of master/slave selector switch A18, as well as being utilized as an input to the RxD(MC)synchronizer S(MC).

The recovered clock receive data RxD(RC) is routed through a go-ahead detector and regenerator GAD/R formed by a four-bit counter A20 in conjunction with an Exclusive OR-gate A31. The four-bit counter counts on each successive clock RC and is reset each time the recovered clock receive data inputted at its reset terminal goes to zero. Thus, the count of counter A20 will continually reflect the number of any successive one-state data bits of eight or less, occurring in recovered clock receive data RxD and its normally low output ZI will go high upon the occurrence of a count of eight successive ones, which will drive the Exclusive OR-gate A31 to a zero output state, to thereby insert a zero into the data stream for a one-bit period and again for every eight successive ones thereafter as may be present in the data stream of recovered clock receive data RxD(RC). Thus, the presence or absence of a go-ahead is detected in an active data stream of ones and zeros or ones, and a go-ahead is effectively introduced into the active data stream in the absence of a go-ahead in the recovered clock receive data RxD(RC).

The functioning of go-ahead detector and regenerator GAD/R may be simply monitored by the microprocessor, through the medium of flip-flop A26, and status check GAD/CK1 and GAD/CK2 which may be periodically inspected by the microprocessor MP. Flip-flop A26 may be reset by an input GAD R/S from the microprocessor MP for continued monitoring action, as may be desired. This checking operation for the go-ahead detector and regenerator GAD/R is optional as a safeguard, and is not a requirement for operation.

The variable divide-by-forty counter VD40 provides not only the 1 mhz recovered clock $\overline{RC}$, but also provides two additional recovered clock frequencies at its divide-by-twenty and divide-by-ten outputs, being respectively RC2 at 2 mhz and $\overline{RC4}$ at 4 mhz.

As has been previously discussed, the frequency of recovered clock RC and $\overline{RC}$ will have been slaved to the 1 mhz master clock of the instant loop master node 13LM. Thus at the instant master node 13LM its master clock MC and $\overline{MC}$ will be in effective frequency synchronism with its recovered clock RC and RC. However, the phase relationship of the recovered clock at this master node 13LM relative to the on-board instant master clock MC(L) generated at this loop master mode 13LM is unknown, and accordingly the master clock may not be utilized to reliably sample either raw receive date RxD or recovered clock receive data RxD(RC) as such. Nor can the master clock MC be varied in frequency to effect this phasing, as this would destroy the constant loop time-base.

The existence of this problem has been a primary reason for the conventional fixed single master mode approach, in which the problem has been solved simply by taking all data off the loop at the master node as it returns into the master node, and then reformatting and retransmitting such if another slave node is the intended destination address. This does not require any action other than effective sampling of the incoming data with a recovered receive clock to thereby enable reading of the data by the fixed single master, since entirely newly clocked transmissions will be sent out by the fixed single master which is simply clocked by its on-board master clock.

This highly vexing problem is solved in a facile and deceptively elegantly simple, yet highly elusive and sophisticated manner by the comparison of the phase relationship of recovered clock RC and the instant master's on-board master clock MC, and outputting for master clock MC sampling suitable phase-shifted recovered clock receive data as a function of the phase relationship comparison.

In solving this problem, study of the relative outputs will reveal that a two-input, four-state truth table may be formed as a function of the respective status of recovered clock RC and recovered clock shifted +90° RC+90° at the time of occurrence of the positive edge of master clock MC. This truth table will reveal the phase relationship between recovered clock RC and master clock MC on a quadrant basis.

The recovered clock receive data RxD(RC) may thus be shifted by a suitable quadrant amount to assure adequate sampling by master clock. In fact, a 45° offset quadrant shifting is considered most desirable, and such is implemented in the illustrative and preferred embodiment, as shown somewhat particularly in FIGS. 3A and 3B, and in full detail in FIGS. 5A, 5B and 5C.

A relatively simple system may be used to implement a two-input four-state truth table reflecting the instant states of recovered clock $\overline{RC}$, and +90° shifted recovered clock $\overline{RC}$+90° at the time of occurrence of the positive edge of master clock MC, for shifting of recovered clock receive data RxD(RC) by a proper quadrant shift basis to enable effective sampling of the thus coarse-shifted recovered clock RxD(RC+SEL $\phi$) by master clock MC, on a theoretical basis of sharp clean fixed relation vertical transitions of data and a corresponding fixed relation of RC to MC. However, in the real world, data transitions are generally accompanied by a degree of jitter which renders the data transition zones, and thus the recovered clock RC and $\overline{RC}$, uncertain for determining the true status of the data in such data transition zones, with concomitant uncertainty and unreliability of recovered clock RC, $\overline{RC}$. Accordingly, any sampling at the data quadrant transition zones will yield unreliable data state information as to which quadrant is being sampled, which may, if the quadrant phase relation sampling of recovered clock $\overline{RC}$ and 90° shifted recovered clock ($\overline{RC}$+90°) is sampled near the $\overline{RC}$, $\overline{RC}$+90° quadrant boundaries, yield a different quadrant phase shift amount indication for the shifting of the recovered clock receive data RxD(RC) for sampling by master clock MC, and may shift back and forth at random between these two quadrant phase shift amount indications for successive or various ones of the data transitions. If this master clock sampling occurs at the $\overline{RC}$ quadrant boundaries which correspond to recovered clock receive data RxD(RC) quadrant boundaries between data quadrants 1 and 2, 2 and 3, or 3 and 4, (which correspond to shifts between Cases 4, 3 and 2 of FIGS. 8B and 8C and FIG. 9), this variation of the indicated quadrant shift requirement resulting from MC sampling of $\overline{RC}$ and $\overline{RC}$+90° corresponding, at various ones of such samplings, to one or the other of, the two adjoining quadrants of any one of these pairs of quadrants, will not be of any consequence, as the recovered clock receive data RxD(RC) may be adequately sampled by the master clock MC, and the same data bit will be sampled in such case, if the data RxD(RC) is shifted by either of the two indicated phase shift amounts indicated by such MC sampling across these boundaries. However, if the sampling of $\overline{RC}$ and $\overline{RC}$+90° by master clock MC occurs on $\overline{RC}$ and $\overline{RC}$+90° which correspond to data transition zones (i.e., 0−° to 0+°), at the boundary between the fourth quadrant of one data bit and the first quadrant of one data bit and the first quadrant of the adjoining data bit) of received clock receive data RxD(RC) which are in general time alignment with master clock MC, (which correspond to shifts between Cases 4, 3 and 2 of FIGS. 8B and 8C and FIG. 9) then the resultant quadrant shift indications by the MC/$\overline{RC}$, $\overline{RC}$+90° samplings at various ones of the recovered clock receive data RxD(RC) transitions will shift between a quadrant phase shift angle based on a sample of either of the last quadrant of a given bit and the first quadrant of the same bit, on succeeding samples, or the first quadrant of a given bit and the last quadrant of the second succeeding bit. Viewed at either end of a bit, the resulting two-quadrant shifts will cause the addition of a bit or the loss of a bit of data neither of which is desired.

Figure 8A:
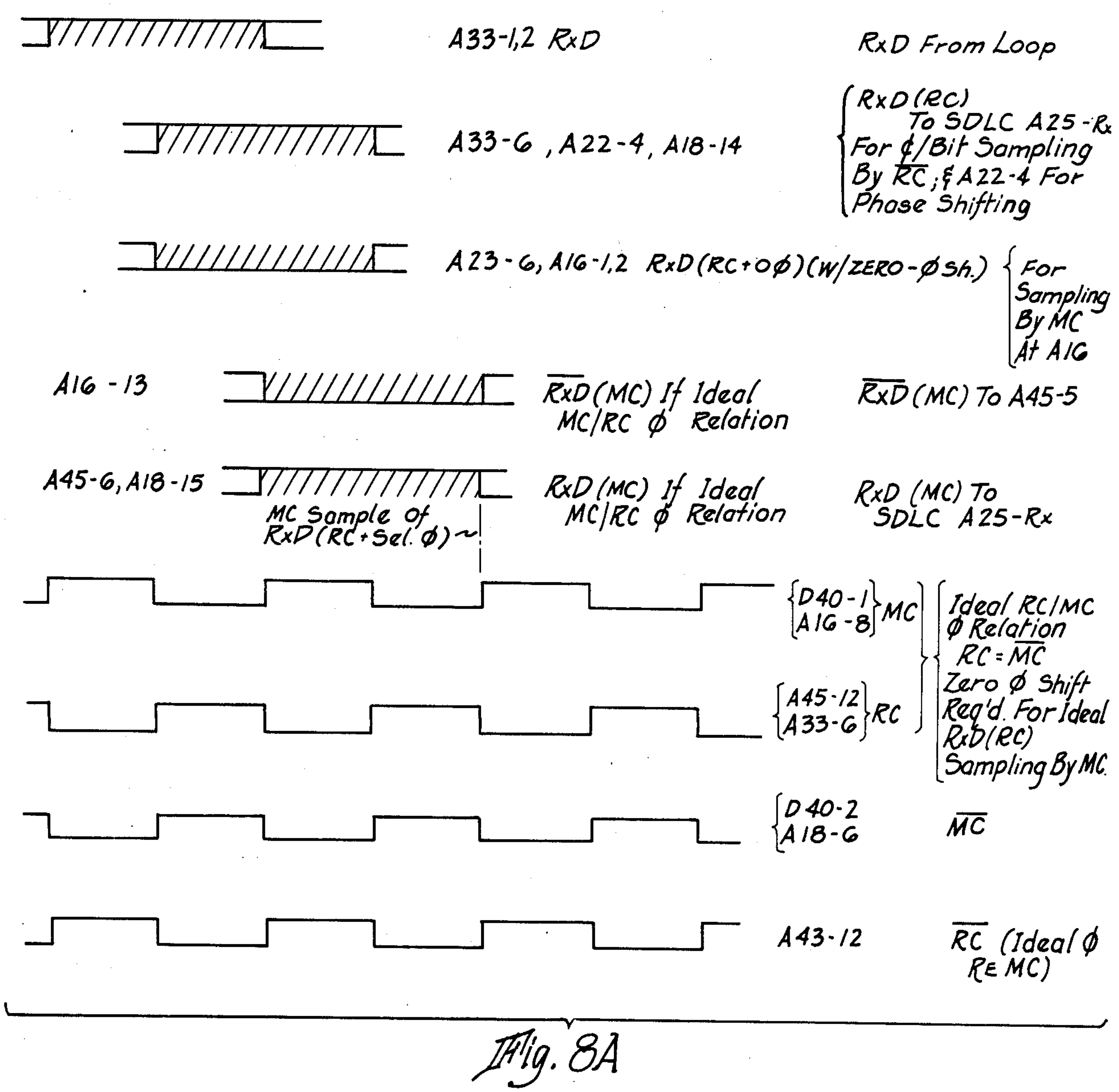
Figure 8B:
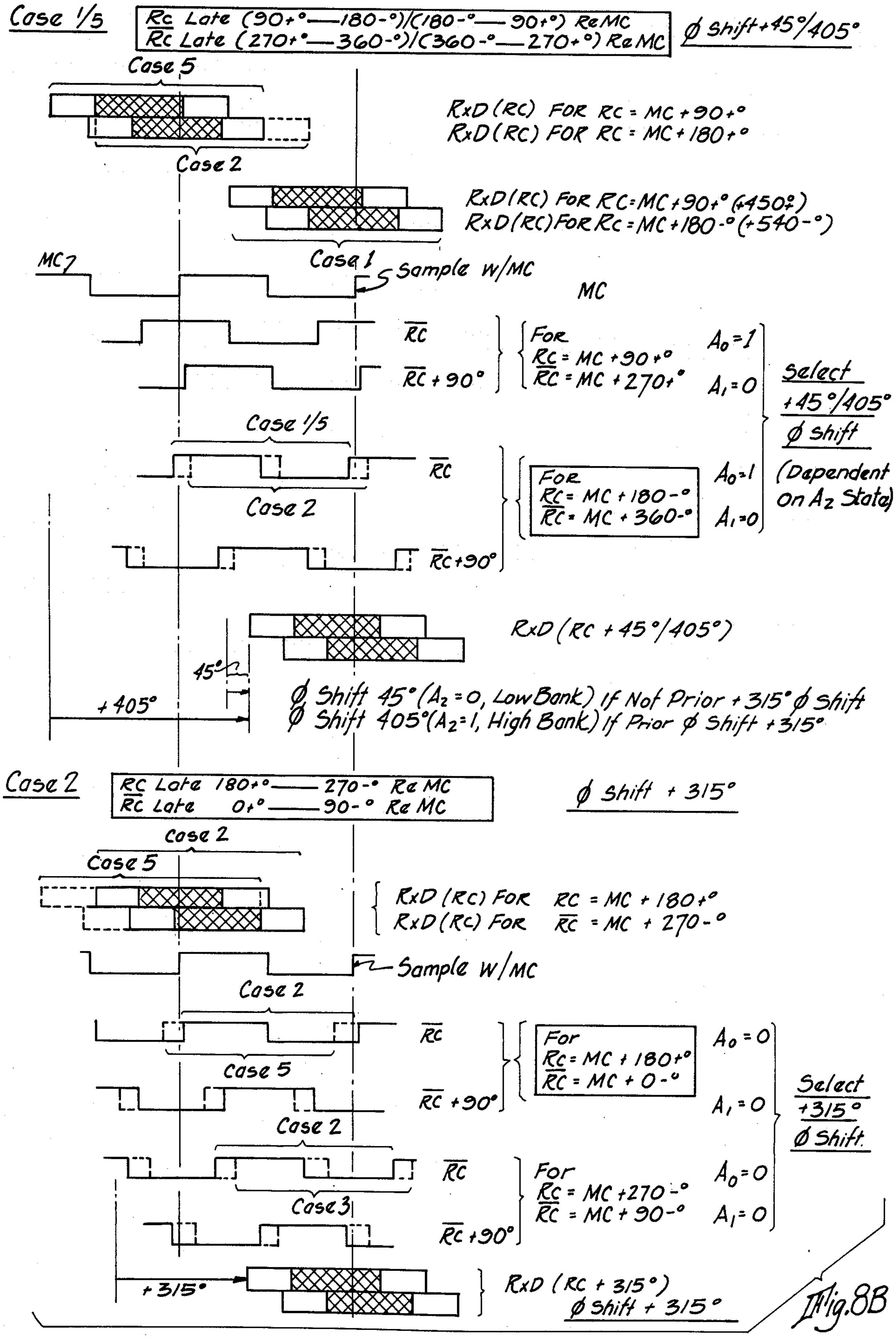
Figure 8C:
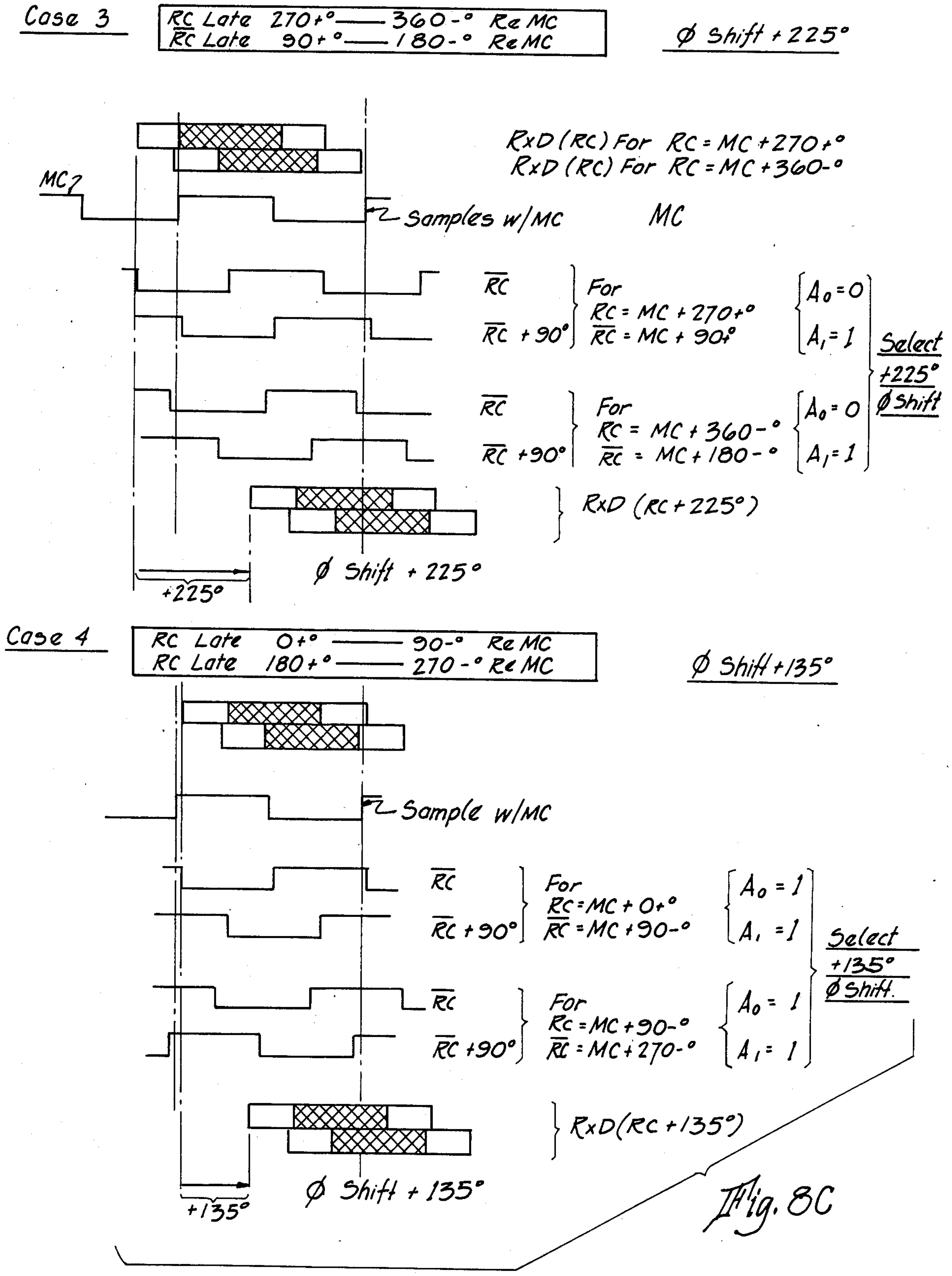
Figure 9:
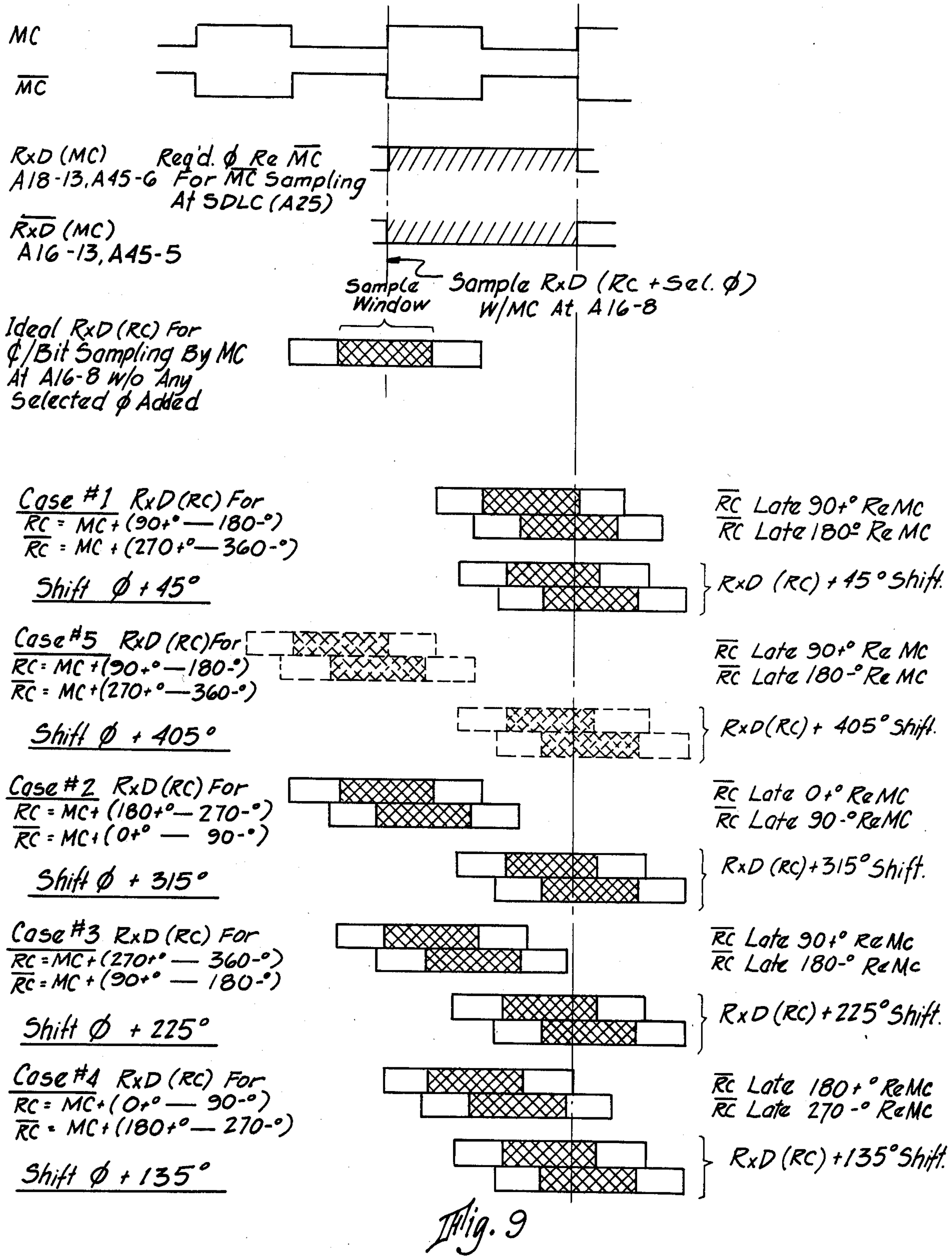

Accordingly, in the illustrated and preferred embodiment of the invention, a three-input truth table is employed, with the same two inputs based on master clock sampling of recovered clock receive data RxD(RC) and +90° shifted recovered clock receive data RxD(RC+90°), as well as a third two-state input which is a function of both the relative truth table states of the first two data sample state inputs, and the change in the relative state of such data sample inputs, and which third input selects one or the other of two banks of four each of five 90° apart, 45° offset, phase-shifted data, one of the banks being a low bank made up of +45°, +135°, +225° and +315° phase shifted data, and the other bank being a low bank of +135°, +225°, +315°, and +405°. Selection (as shown in FIGS. 8B and 8C) of one of +45°/+405°, +135°, +225°, and +315° is determined by the two inputs resulting from each sampling of RC and RC+90° by MC, and the selection of the high or low bank (to thereby also select between +45° and +405°) is determined by the instant state of the third input, which is a function of both its own preceding state and the preceding state of each of the other two basic quadrant determining inputs.

A suitable three-input truth table for effecting reliable shifting of recovered clock receive data RxD(RC) is shown in FIG. 10, and an illustrative implementation thereof is shown in some particularity, in the generalized schematic of FIGS. 3A and 3B, and in detail in the schematic of FIGS. 5A, 5B and 5C.

In implementing this important aspect of Applicant's invention, the recovered clock receive data RxD(RC) is, in the illustrative preferred embodiment, phase-shifted by an initial 45° amount and by 90° increments thereafter through the sampling of recovered clock receive data RxD(RC) by the 4 mhz recovered clock $\overline{RC4}$ in order to place a central clearly acceptable sample window for each bit of the selected such place shifted data RxD(RC+SEL $\phi$) in a position where master clock MC sampling will occur therewithin, even in the presence of the unusual condition of jitter over a ±90° zone on either side of the data bit transitions. Inspection will reveal that simple 90° shifts, without offset, will not clearly place the desired 180° clearly acceptable central sample window for all data shifts where the master clock sampling thereof will clearly lie within this window, but will at one or the other end of each detected quadrant, result in placement of the desired 180° clearly acceptable sample window of the phase shifted data such that the MC sample point lies at one or the other end of the desired clearly acceptable 180° sample window. However, for conditions of relatively low jitter, the acceptable sample window can be extended, and may enable the use of straight 90° shifts of RxD(RC) for selection according to a suitable truth table similar to that of FIG. 10, or otherwise as may be desired. It will thus be appreciated that, while 45° offset 90° shifts are desired and effected according to the illustrative and preferred embodiment, other phase shifting including straight 90° shifts may be employed, although such alternative shifting may provide less margin of reliable safety in sampling as in the case of straight 90° shifts, and such are within the ambit and scope of practice of the broad aspects of the invention in this respect. As recovered clock $\overline{RC4}$ first goes positive 45° after the rising or positive edge of recovered clock RC, the first sampling of any one bit of recovered clock receive data RxD(RC) by recovered clock $\overline{RC4}$ at the first stage of five-bit shift register A22 will result in a 45° phase shift of recovered clock receive data RxD(RC) in the shift register A22 first stage, which data is identified as RxD/(RC+45°). The next sampling of recovered clock receive data RxD(RC) by recovered clock $\overline{RC4}$ will occur 90° later and will again form recovered clock receive data shifted by 45°, and the original 45° shifted data will be shifted through an additional 90° by shifting to the next stage of the shift register A11, where it will appear as RxD/(RC+135°).

This initial 45° offset and 90° apart sampling and phase-shifting action and internal shift register shifting will continue for all recovered clock receive data RxD(RC), thereby resulting in the shift register A22 being filled on a continuing basis with sequentially sampled recovered clock receive data RxD(RC) shifted through five stages of +45°, +135°, +225°, +315°, and +405°. This phase-shifted data appears on a running continuous basis at the successive outputs of shift register A22, reflecting at any given time the present and past four successive samplings by recovered clock $\overline{RC4}$ of recovered clock receive data RxD(RC) inputted to the data input for shift register A22. These respective 45° offset, 90° apart, phase-shifted outputs are designated respectively as RxD/(RC+45°), RxD/(RC+135°), RxD(RC+225°), RxD/RC+315°), and RxD(RC+405°).

Recovered clock $\overline{RC}$ (1 mhz) is sampled at flip-flop A19B by the 2 mhz recovered clock RC2, to form recovered clock plus 90°, designated as $\overline{RC}$+90°. Both the recovered clock $\overline{RC}$ and the plus ninety degree shifted clock $\overline{RC}$+90° are inputted to the RxD(MC) synchronizer S(MC) for phase selection action by phase shifted data selector A23 in accordance with the truth table of FIG. 4.

The five stages of phase-shifted data at the outputs of five-bit shift register A22 forward and rearward uncertainty movement (caused by receive data RxD jitter or otherwise) of recovered clock $\overline{RC}$, and +90° shifted recovered clock $\overline{RC}$+90° relative to master clock MC, across $\overline{RC}$ and $\overline{RC}$+90°-indicated quadrant boundaries corresponding to recovered clock receive data RxD(RC) quadrant boundaries between quadrants 1 and 2, 2 and 3, and 3 and 4, as well as between 4 and an additional quadrant 5 adjoining quadrant 4, but lying in quadrant 1 of the adjoining following data bit and corresponding in MC/RC, $\overline{RC}$ +90° sampled state phase shift indication to the MC/RC, RC+90°-sampled phase shift indications for the first quadrant of the instant data bit intended to be sampled by master clock MC at shift register A16-8 after suitable selected phase shifting.

As discussed above, this duality and consequent uncertainty of phase-shift indication for quadrants 1 and 5 (adjoining bit 1) for each data bit of RxD(RC) is eliminated by addition of a third input, and thereby forming an eight-place truth table, in which two overlapping banks of, respectively, the low four phase shifts of data RxD(RC+$\phi$) and the overlapping high four phase shifts of data RxD(RC+$\phi$), are employed for bank selection in conjunction with the basic quadrant selection as a function of the MC/$\overline{RC}$, $\overline{RC}$+90 sample states.

The respective states of each of $\overline{RC}$ and $\overline{RC}$+90° for sampling by master clock MC are connected to the $D_0$ and $D_1$ inputs of a three-input ($D_0$, $D_1$, $D_2$) three-output ($Q_0$, $Q_1$, $Q_2$) latch A24. The latch outputs $Q_0$, $Q_1$, and $Q_2$ reflect at each clock MC the then present high or low input state of each of the $D_0$, $D_1$, $D_2$ at the time of clocked latching by master clock MC.

Recovered clock $\overline{RC}$ has its rising edge at the center of each data bit of recovered clock receive data RxD(RC), thereby delineating with detectable clarity not only the center of each data bit, but also concomitantly delineating the boundary between the two halves of the data bit, while the falling edges of recovered clock $\overline{RC}$ delineate the opposite ends of each data bit of recovered clock receive data RxD(RC). This center line of the data bit is also the most ideal data bit location for center-bit sampling of the data by a clock (e.g., master clock MC), and can thus be employed to indicate the phase location of the RxD(RC) data bit relative to the sampling master clock MC. Plus ninety degree shifted recovered clock $\overline{RC}$, forming $\overline{RC}$+90°, will in turn clearly delineate the boundaries between the middle half (or middle two quadrants) and the adjoining first and fourth quadrants of each bit of RxD(RC) data. Each of the two end halves of the data bit is indicated by a different binary state of $\overline{RC}$, and change of state of $\overline{RC}$ will indicate passage from one half to the other. Similarly, the opposite boundaries of the central half of each data bit are delineated from the two adjoining opposite end quadrants by associated changes of binary state of $\overline{RC}+90°$ across each such boundary. Combining these two sets of binary information on the states of $\overline{RC}$ and $\overline{RC}+90°$ relative to the related above-discussed boundaries, in a two-input two-state ($\overline{RC}$, and $\overline{RC}+90°$) truth table will accordingly provide four distinct two input binary conditions corresponding to and distinctly indicating the presence of each of the four quadrants of each bit of recovered clock receive data RxD(RC), as well as the precise lines of demarcation therebetween. Such a truth table is reflected in the basic two-input $A_0$, $A_1$ input section of the three-input, two-state truth table of FIG. 10. The bit quadrants are reflected by the four different combinations of $A_0$, $A_1$, and the boundaries between RxD(RC) data bit quadrants as well as the direction of movement across quadrant lines by respective changes of state of one or the other of the two inputs $A_0$ and $A_1$.

Each of the four distinct two-bit, two-state binary places or conditions may not only indicate the quadrant of the RxD(RC) data bit being (indirectly) examined, but also will, if such two-digit number is obtained by sampling the $\overline{RC}$ and $\overline{RC}+90°$ wave forms with master clock MC, conversely yield the location of the data bit, on a four-quadrant phase difference or location basis relative to master clock MC. Since the relative quadrant phase location for each successive data bit of recovered clock receive data RxD(RC) will also determine and thereby be likewise indicative of the correct closest quadrature phase shifting which is required for each such master clock-MC-sampled bit of RxD(RC) data. Accordingly, the truth table may be drawn to simply directly indicate the data shift angle required as to each data bit of RxD(RC) for satisfactory sampling by master clock MC. Such are the indications of the various places of both the basic two binary bit input truth table as well as the eight-place three binary input overall truth table of FIG. 10.

In the truth table of FIG. 10, the instant value of $A_2$ as it appears at the positive edge of each succeeding master clock cycle indicates (and may serve to effect corresponding selection at phase shifted data selector A23) which of two banks (a high bank, indicated by a one or high state of $A_2$, and a low bank, indicated by a zero or low state or $A_2$) of the truth table are to be selected. The first two inputs of the truth table determine the quadrature phase shift angle being selected on a basis of +135°, +225°, +315°, and a combination 45°/405° possibility to accommodate overflow possibility requirements for a further quadrant of phase shifting. The two banks represented and indicated by the state of the two-state input $A_2$ are simply to delineate between the dual 45° and 405° shift indicated by the basic two-place truth table. Thus, by suitably interconnecting the various ones of the five 90°-apart, 45°-offset, shift register A24 outputs at A22−7, 11; −10, 13; −12, 14; and −15, preferably by hard-wired connections as shown in FIG. 5B (or, if desired, by suitable software or firmware, although such is much more easily and reliably simply hard-wired, as shown in the illustrated and preferred embodiment), the eight-place, five-condition truth table of FIG. 10 (with selected overlapping repetitions of the overlapping middle ones of the conditions in both of two banks and which are used as bank shift operators), may be directly implemented, through the medium of latch A24, three-input controlled multiplexer A23 which forms the phase shifted data selector A23, and the interconnected locic elements formed by NAND-gates A9A and A9B, inverter A2, and OR-gate A10, which interconnected logic elements form overflow detector OD.

In implementing the truth table, selected ones of five different phase-shifted recovered clock receive data outputs from shift register A22 are interconnected to form (in accordance with the FIG. 10 truth table), the respective eight data inputs to a multiplexer A23 having three selection control inputs at pins A23−11, −10 and −9, and which inputs are designated as $A_0$, $A_1$, and $A_2$ on a corresponding basis to inputs $A_0$, $A_1$, and $A_2$ of the FIG. 10 truth table.

The $A_2$ input is a self-feedback control input, whose instant state (excluding the startup state, which is of no practical consequence) is determined by the preceding states of all three of the clocked latch A24 outputs, which form the multiplexer A23 control inputs $A_0$, $A_1$, $A_2$ for the preceding clock MC to latch A24.

Thus, the preceding state of the combination of $A_0$, $A_1$, and $A_2$ determines and causes selection at the $A_2$ selection control input A23−9, of the desired particular bank of phase shift angle adjustments, either the low bank composed of +45°, +135°, +225°, and +315°, or the high bank composed of +135°, +225°, +315° and +405°. The reasoning is that if one has reached the +315° phase shift adjustment, then since the low bank cannot accommodate a shift on both sides thereof to accommodate the possibility of subsequent selection of either +225° or +405°, while the high bank can so accommodate both of these possible changes, the only totally safe action is to shift to the high bank (or remain there if already in the high bank), for the next clocked truth table selection (and thus for the corresponding selected phase angle adjusted output RxD(RC+SELϕ) by phase shifted data selector A23 inputs $A_0$, $A_1$, and $A_2$. Thus, the logic elements of the overflow detector are suitably arranged and selected to cause a one state to be generated by this overflow logic OD, outputting at NAND-gate A9B−6, for any clocked $Q_0$, $Q_1$, $Q_2$ outputs in which a +315° selection is indicated by the outputs $Q_0$, $Q_1$, irrespective of the previous $A_2'$ state reflected at present output $Q_2$, and selector input $A_2$. This new $A_2'$ one state will be reflected at $Q_2$ and $A_2$ on the next clock, which will effect a high bank selection at phase shifted data selector A23.

Similarly, any time that a given clocked truth table selection (and corresponding output of RxD(RC+SELϕ)) is at +135°, the only totally safe procedure is to select the low bank on the next clocked selection at latch A24, and such is effected in accordance with the truth table of FIG. 10.

While not necessary for protection, the third input $A_2$ to phase shifted data selector A23 also changes from a high bank selection to a low bank selection (or remains in the low bank if already there) on succeeding clocked latch A24 outputs $Q_0$, $Q_1$, $Q_3$ and phase shifted data selector A23 corresponding control inputs $A_0$, $A_1$, $A_2$, when the phase shift angle adjustment of +225° is reached.

Thus, a form of hysteresis is introduced, in which the prior state of the three selection control inputs $A_0$, $A_1$, $A_2$ determines the next clocked state of one (the bank select control input $A_2$) of the three inputs $A_0$, $A_1$ and $A_2$, and with shifting or not shifting between states of the one feed-back controlled input $A_2$ being in two directions for different ones of the overlapping selectable angles in each bank, on a hysteresis loop basis. Any normally encountered jitter in RxD(RC) will not exceed plus/or minus an entire quadrant (±90°) by any means and, accordingly, any shifting of master clock sampling between quadrants, with resultant changes in inputs $A_0$ and $A_1$ (and basic four-place truth table values of +45°/405°, +135°, +225°, and +315°), will be only between any given two quadrants. Shifting back and forth between banks will thus not normally occur in the illustrative system and method embodiment and mode of practice of the invention, except in the situation where there is back-and-forth movement between the quadrant shift selection of +225° and +315°, as it will (except for the indicated back-and-forth selections of +225° and +315°) only be necessary to make a single shift of banks to accommodate overflow possibility at the lower end of the high bank and the high end of the low bank.

Once any such initial bank shifting is effected, the bank selection at $A_2$ can be expected to remain constant. In the case of shifts between +315° and +225° in both directions, it will be seen that a phase shift selection of +225° will cause the next following shift angle selection by the $A_0$, $A_1$ inputs to be made in the low bank, where the selections will continue to be made on succeeding $A_0$, $A_1$, $A_2$ states (i.e., $A_2$ will remain low or zero state), until a +315 selection is indicated and made by the $A_0$, $A_1$ input states beings 0, 0, which will cause OR gate A10 output at A10−3 to be low, thereby forcing a one state at NAND-gate A9A output A9A−6 (irrespective of the prior state of $A_2$), thus making the upcoming $A_2$ input (designated in the truth table of FIG. 10 as $A_2'$) high or a one state, thereby causing the next selection to be made in the high bank.

This high bank selection will continue for future phase angle shift selections of +315°, until a +225° selection is made by an $A_0$, $A_1$ input to data shifted phase selector A23 at A23−10, 9, 1, which will again make $A_2'$ and the next clocked $A_2$ state a zero, thereby causing the next clock selection at phase shifted data selector A23 to be made in the low bank.

This bank selection is effected in the illustrated and preferred embodiment through a relatively simple overflow detector generally designated OD in FIG. 3B, and illustrated in detail in FIG. 5B

Overflow detector OD is formed by a relatively simple logic arrangement including NAND-gates 9A and 9B, inverter A2 and OR-gate A10. The instant states of $A_0$ and $A_1$ at the outputs A24−10 and 12 of latch A24 form the inputs to OR-gate A10, while the inverted state of $A_1$ is fed as the output of inverter $A_2$ to one of two inputs to the NAND-gate A9A, the other input being the instant state of output $A_1$ from latch A24, pin 12.

In turn, the output of NAND-gate A9A forms one of two inputs to NAND-gate A9B, whose output at A9B−6 forms the feedback input $A_2'$ to latch A24, pin 14, which is the third input to the latch, and together with the new $A_0$, $A_1$ states of latch pins A24−11, and −12 at the time of the next master clock MC applied to latch A24 at clock input A24−9, will together form the respective states of the next set of selection control inputs $A_0$, $A_1$ and $A_2$ to phase shifted data selector A23. Thus, the $A_2$ value state (high or low) will be determined, through the medium of fixed logic embodied in the detector OD (A9A, A9B, A1, A10), on the basis of the binary state (high or low) of the three truth table inputs formed by the preceding states of $A_0$, $A_1$ and $A_2$ at latch A24 at pins A24−10, −12, −13 and phase shifted data selector A23 at input selection pins A23−11, −10 and −9.

The operation of the overflow detector OD (formed by A9A, A9B, A2, and A10) is elegantly simple and straightforward, and will not be described for each three value set input thereto by $A_0$, $A_1$ and $A_2$, as such may be readily traced through the circuit. Several illustrative examples are believed to suffice. As one example, assume that $A_0$, $A_1$ and $A_2$ are 0, 0, 0, representing selection of a phase shift of +315° (appearing at phase shifted data selector input pin A23−4), as shown by the truth table of FIG. 10. This combined input to the overflow detector logic OD will effect a 1 at NAND-gate A9A−3, and the two inputs to A9B at A9B−4 and −5 will thus be a one and a zero, which will produce a one at the output pin A9B−6 and NAND-gate A9B, as the next input $A_2'$ to latch A24 at pin A24−14, for the next clocked $A_2$ input to phase shifted data selector A23 and which, irrespective of the new state of the master clock sampled $\overline{RC}$ and $\overline{RC}$+90° inputs at latch A24, pins A24−10 and −9, will therefore result in the next master clocked (MC) output $A_2$ at A24−13 being a one, thereby inputting an $A_2$ state of one to phase shifted data selector A23, causing selection of the high bank, which enables accommodation of master clock sampling movement $\overline{RC}$ and $\overline{RC}$+90° representative of movement across either of the adjoining bit quadrant boundaries. Subsequent selection is permitted after the high bank +315° selection of +315°, or either of the adjoining quadrant shift selection values +225° and +415° on either side thereof, depending on where the given quadrant is being sampled by master clock, either at one end or the other for the +315° shift angle adjustment.

The selection of a +315° phase shift by the states of $A_0$ and $A_1$ will always result in a high bank selection on the next clock. Again consider the high bank +315° $A_0$, $A_1$, $A_2$ input states of 001. The input A9B−4 will thus be low or a zero, and the NAND-gate output at A9B−6 will remain a one, Thus, $A_2'$ will be a one, and the next clock selection will show $A_2$ as a one, and the high bank will again be selected.

With the inputs $A_0$, $A_1$ and $A_2$ as 011, representative of a high bank selection of a +225° phase shift selection RxD(RC+SELϕ), shift to the low bank is desired for the next master clocked (MC) selection output from latch A24 at A24−15. With this 011 input to the overflow detector logic, the input at A9B−4 will be a zero, and the other input at A9B−5 will be a one. NAND-gate A9B's output at A9B−6, and thus $A_2'$, will be a zero, thus causing a $Q_2$ output at A24−15 on the next clock by master clock MC of a zero, representing a low bank selection input at $A_2$ of phase shifted data selector A23, with consequent selection of whatever one of the low bank available shift angles +45°, +135°, +225°, and +315° is reflected by this next clocked-in state of $A_0$ and $A_1$ for this particular set of $A_0$, $A_1$ and $A_2$.

If on the next clock a 00 input is present on A24−11 and −13, respectively representing +315° phase shift selective, the concurrent $A_2'$ input at latch A24 pin A24−14 being a zero from the preceding +225° selection. will effect a low bank selection, and the overflow detector logic OD will again form a one state for $A_2'$ to thereby cause the next upcoming selection to be made in the high bank, thus illustrating completion of the hysteresis in the overflow detector OD feedback loop and bank selection.

A selection of +405°, indicated by $A_0$, $A_1$, $A_2$ data shifted place selector selection inputs of 101 can only occur if the previous selection has been either +315° or +405°. Otherwise, an $A_0$, $A_1$ input of 10 will be accompanied by an $A_2$ state of zero, which will effect the low bank selection of +45°. This +45° selection permits selection movement only on one side, to and from +135°. If a +315° shift selection occurs following a +45° shift selection, then $A_2'$ will change to a high or one state, to thereby effect a high bank selection on the next clock MC, whereupon any subsequent RxD(RC) jitter movement across this quadrant boundary will be accommodated by movement between the 315° and +405° shift selections. While this shifting from +45° to +315° will cause loss of a bit, this will only occur once at startup, if it occurs at all, and may thus be expected to be inconsequential for normal operation.

Selected phase-shifted recovered clock receive data RxD(RC+SEL $\phi$) appears at the output A23−6 of phase shifted data selector A-23 and, is in inverted form in the illustrative example; and upon being effectively sampled by master clock MC at eight-bit shift register A16, and subsequent eight-bit shift-delayed passage through shift register A16, the clocked data output from shift register A16 at A16−13 forms master clock receive data $\overline{\text{RxD}}$(MC), in asbsolute phase synchronism with master clock MC and $\overline{\text{MC}}$. As previously noted, the term "absolute phase synchronization" as used in the specification and Claims and as used in the foregoing statement is intended to mean that the bit or pulse start time for each of the respective referenced digital signals is identical; the signals in the preceding sentence being respectively the master clock receive data signal $\overline{\text{RxD}}$(MC) and the master clock signal itself MC and $\overline{\text{MC}}$.

Passing master clock receive data $\overline{\text{Rxd}}$(MC) through inverter A45 will invert this data and effect an upright input of master clock receive data RxdD(MC) to the master/slave selector switch A18 at input A18−13, which RxD(MC) input will be in absolute synchronism with master clock MC, $\overline{\text{MC}}$, enabling normal operation by SDLC A25 when selector switch is in either its master or slave mode state, as associated master clock $\overline{\text{MC}}$ is also inputted to master/slave selector switch A18 at A18−6, and as previously described, recovered clock receive data RxD(RC) and associated recovered clock $\overline{\text{RC}}$ are present at master/slave selector switch pins A18−14 and A18−5 respectively.

In composite FIGS. 5A, 5B and 5C, the circuitry of the receive clock recover recovered clock receive data synchronizer S(RC), the go-ahead detector and generator GAD/R and the master clock receive data (RxD)(MC) synchronizer S(MC) subsystem units is shown in detail.

These Figures have been alluded to in the prior description in varying detail. For the sake of brevity, this circuitry will now be more specifically discussed to the extent necessary to relate such to the preceding description of these subsystem units.

Raw receive data RxD is inputted from receiver/converter RCV to $J\overline{K}$ flip-flop A33A at A33A-2, -3, where it is sampled by recovered clock RC from the output of inverter A45, applied to clock input A33A−4, to thereby provide recovered clock receive data at its Q output A33A-6. Raw receive data RxD is also inputted to $J\overline{K}$ flip-flop A33B at A33−13 −14, where it is sampled by recovered clock $\overline{\text{RC}}$ from divide-by eight counter A43 at A43−12, by connection to clock input terminal A33B−12.

The outputs at A33A−6 and A33B−9 form the inputs to Exclusive OR-gate A31B at A31B−10 and −9, respectively.

As will be seen from FIGS. 6A and 6B, the A33B−9 will reflect whether raw received data RxD is early or late relative to recovered clock $\overline{\text{RC}}$, as an early data transition of raw received data RxD will appear in the sample by $\overline{\text{RC}}$, whereas a late transition will be missed, and will not appear until the next clock edge. However, it will be seen in FIGS. 6A and 6B that interpretation of this relative error sense at A33B−9 differs in value, dependent on whether the raw received data RxD has changed from a one to a zero or vice versa. In going from a one to a zero, or from a zero to a one, an early error-sense at A33B−9 will merely be different than the preceding state, i.e., for a change of raw received data RxD from a one to a zero state, an early data transition will give a zero state at A33B−9, as compared to the raw data RxD prior state of one, and for a change of raw received data from a zero to a one state, an early data transition will be reflected in a zero at A33B−9. In both situations, an early transition of raw received data RxD will result in an output at the $\overline{\text{Q}}$ output pin A33B−9 which is the same state as the state of RxD before the transition.

It will be seen from FIGS. 6A and 6B that for any data transition in raw received data RxD, for early data transitions relative to the positive sampling edge of recovered clock $\overline{\text{RC}}$ (which occurs at the transition from count 19 to count 20 of variable divide-by-forty counter VD40), the sampled raw data RxD appearing at 33B9 and $\overline{\text{RxD}}$($\overline{\text{RC}}$) will reflect the transition, and thus be changed relative to its previous state of one or zero, whereas for late data transitions relative to recovered clock $\overline{\text{RC}}$, the transition will be missed by the positive sampling edge of recovered clock $\overline{\text{RC}}$, and thus the sampled output at A33B−9 will be unchanged relative to the state of the raw received data RxD prior to the transition, irrespective of whether the change be from a one to a zero state, or from a zero to a one state. However, it will be noted that this is only a relative indication of error sense, and requires reference to the prior state of the raw received data RxD. It will also be noted that at count 39 for variable divide-by-forty counter VD40 (at which time a clock update correction will be made in counter VD40 if a data transition has occurred during the immediately preceding 40-count period, the RC-sampled output RxD(RC) at A33A−6 (which is the result of 180° later sampling of raw received data RxD by recovered clock RC (i.e., at the normal transition from count 39 to count 0 of variable divide-by-forty counter VD40) will reflect the prior state of the raw receive data RxD, and therefore may be used as a simultaneous comparison for providing an absolute error sense ES at count 39 of variable divide-by-forty counter VD40.

The sampled outputs at the Q output of A33A−6 and the $\overline{\text{Q}}$ output of A33B−9 are compared by the difference detector formed by Exclusive OR-gate A31B, whose output A31B−8 reflects the absolute error sense ES. For the comparison of the particular chosen Q and $\overline{\text{Q}}$ output forms of sampled data RxD(RC) and $\overline{\text{RxD}}$($\overline{\text{RC}}$) from A33A and A33B, a zero state of error sense ES represents an early data transition relative to the positive edge (VD40 count 20) of $\overline{RC}$, and a one state of error sense ES represents a late data transition.

A momentary correction of recovered clock RC and $\overline{RC}$ may thus be made at count 39 of the variable divide-by-forty counter VD40 after each data transition of raw received data RxD, based on the state of error sense ES, by providing suitable AND or NAND-gating logic (block GCL, in FIGS. 3A, and B and gates A51A, A52A, A52B, A42A, A42B and invertor A54 in FIG. 5A) having an input or inputs indicating count 39 only, an input indicating that a data transition has occurred, and an input reflecting error sense ES. For the particular illustrated embodiment, gating logic GCL requires error sense states as above-indicated for effective early or late error sence corrections in the counter VD40 variable divide-by-forty clock count. Other gating logic GCL may be suitably used, which may operate on the basis of reversal of the error sense ES states, in which case the Q output at A33B-10 may be the suitable input to the Exclusive OR-gate A31B at A31B-9 in lieu of the presently employed $\overline{Q}$ output at A33B-9, and relfecting relative error sense ES in the opposite manner.

As data transitions prior to count 39 will be reflected in the recovered clock receive data RxD(RC), which latter is the result of sampling RxD on the next count after count 39 of variable divide-by-forty counter VD40), a comparison of the raw received data RxD with the recovered clock receive data RxD(RC) will provide a signal state which is indicative of a data transition during the 40-count period preceding count zero of variable divide-by-forty counter VD40, and such signal state will be present during count 39.

Accordingly, by inputting the recovered clock receive data RxD(RC) output from 33A-6 and the raw receive data RxD to the inputs A31A-4 and A31A-5 of Exclusive OR-gate A31A, the gate A31A will act as a data transition change detector, the output of which at 31A-6 will be a one state where a normal zero state exists. This one state is designated as clock update CU.

Clock update CU and error sense ES are inputted to the gating logic formed by NAND-gates A42A, A42B, A51A and inverter A54 to effect selected effectively one-count advances or one-count delays or retards of the count sequence of the divide-by-four/five/six section of the variable divide-by-forty counter VD40 as a function of the error sense at count 39 in the presence of a clock update CU.

The divide-by-four/five/six counter section is formed by JK flip-flops A42A, A52B and A44A, together with AND-gates A32A and A32B. NAND-gate A51A, acts as a divide-by-five inhibit control, and NAND-gate A51B acts as a divide-by-four/six control at such time as the divide-by-four control NAND-gate A51A disables the count-by-five sequence by going low from its normal high or one state.

In the normal count sequence of variable divide-by-forty counter VD40, the counter counts from zero to 39 and begins over again at zero. The output states at A52A-5, A52B-9 and A44A-5 for each count are shown in FIG. 7, together with the clock output states at divide-by-eight count section A43, namely A43-14, A43-13 and A43-12.

It will be seen that count 39 is reflected by a distinctive count state, namely an all one state, at A52B-9, A44A-5, A43-14, A43-13 and A43-12, thus enabling the inputting of all of these respective counter outputs into suitable NAND- and AND-gating such that this count 39 is reflected as inputs thereto in conjunction with the instant error sense ES state of zero or one and the clock update CU state of high or one, to effect a clock update change in divide-by-four/five/six-count section, and thus in variable divide-by-forty counter VD40 which outputs recovered clock $\overline{RC}$, RC2 and $\overline{RC4}$ at A43-12, A43-13 and A43-14, respectively.

In the normal divide-by-forty sequence, NAND-gate A51A is normally driven to an active (i.e., low or zero) output state at A51A-6 at every fifth count, which disables flip-flop A52A from toggling, thus effecting the normal divide-by-five count sequence. When A51A-6 goes high, it will enable flip-flop A52A to toggle and, if this occurs at one of any fifth count in the normal count sequence (of 0-39), including count 39, then one or the other of a count-by-six or a count-by-four sequence will result in the divide-by-four/five/six section VD4/5/6 of the counter VD40, dependent on the state of the input at A51B-9 of divide-by-four/six control NAND-gate A51B. The state of this input A51B-9 is a function of the presence of count 39 and the one state reflected by clock update, CU, as well as the instant state of variable error sense ES. If the error sense is at a one state reflecting a late data transition, NAND-gate A42A will be driven low at A42A-6, and NAND-gate A51B will be high at its output A51B-8, thereby enabling toggling of A52B. As A51A also toggles, this results in a distinctive new count-40 state for counter VD40, as shown in FIG. 7. At this count, all of the outputs at A52B-9, A44A-5, A43-14, A43-13 and A43-13 and A43-12 will go low and, at the next clock, the count state of VD40 will reflect a normal one count, as shown in FIG. 7.

The lengthened count sequence 39-40-1-2 will momentarily retard the recovered clock in effective frequency by one-fortieth of a microsecond (i.e., 25 nanoseconds), and will move the next occurring count zero into closer phase synchronism with data transitions of raw receive data RxD.

The presence of an error sense ES of zero state (which reflects an early data transition of raw receive data RxD relative to recovered clock $\overline{RC}$) in the presence of clock update CU will hold NAND-gate A42A output A42A-6 high, which will cause NAND-gate A51B to go low at A51B-8 in view of the concurrent one state of $\overline{Q}$ output at A52A-6, thereby disabling A52B from toggling on the next clock, which will thereby result in a next count state of one, the two-count jump representing a 39-1-2-3 or shortened time period for the clock output $\overline{RC}$ by 25 nanoseconds, to thereby effectively speed up the clock output $\overline{RC}$, RC2, etc. from variable divide-by-forty counter VD40 and accordingly move the recovered clock $\overline{RC}$ into closer phase synchronism with the data transitions of raw receive data RxD.

When the difference between raw receive data transitions is less than the 25-nanosecond clock update correction, the clock update corrections will be effected alternately between an early and a late error sense correction, and data synchronism of recovered clock RC and $\overline{RC}$ with raw received data RxD will have been effected as closely as possible with this receive clock recover system, and which represents a quite adequate and satisfactory effective synchronism for successful operation of the overall system 11 for normal practical purposes.

The master clock receive data synchronizer S(MC) and its mode of operation in the illustrated and preferred embodiment and mode of practice of the invention, has already been described in detail in a previous section of this description, and will not be repeated. Suffice it to say by way of summary that receive data is absolutely phase-synchronized with master clock MC, $\overline{MC}$, through the operation of the master clock receive data synchronizer S(MC), from which it emerges at inverter A45 output A45−6 as master clock receive data RxD(MC), and that this operation is effected by 45° offset, multiple 90° phase shifting of recovered clock receive data RxD(RC) through the action of shift register A22, with the five multiple outputs from shift register A22 forming various ones of eight inputs to phase shifted data selector A23, whose selection control inputs are controlled by master clock-sampled recovered clock $\overline{RC}$ and $\overline{RC}$+90°, forming phase shifted data selector A23 inputs $A_0$, $A_2$, together with a third bank-selection input $A_3$ determined by the preceding state of selection control inputs $A_0$, $A_1$ and $A_2$, and which results in selection of one of the basic multiple phase shifted recovered clock receive data phase shifted data selector A23 selectable inputs, which selected phase-shifted data selector-selectable input forms recovered dlock receive data RxD(RC+SEL $\phi$) which has been coarsely phase-shifted on a quadrant basis relative to master clock MC by a proper amount to enable effective sampling thereof by master clock MC, and which master clock sampling is effected in eight-bit shift register A16, which serves the dual functions of final absolute phase synchronization of receive data with master clock, and of providing an eight-bit delay and storage of master clock receive data RxD(MC) before passage to the SDLC A25 for further intranode processing and retransmittal onto the loop.

Various available standard components may be utilized in carrying out the circuits of FIGS. 5A, 5B, and 5C, and any modifications or improvements thereof, and the practive of the invention may be effected without limitation to specific components, or to specific circuitry. For purposes of illustration, the following standard components have been found satisfactory in the illustrative and preferred embodiment:

| Drawing Reference Number | Standard Industry Part Designation Number |
|---|---|
| CO | XO-33A40 |
| A2 | 74LS04 |
| A9A, B | 74LS00 |
| A10 | 74LS32 |
| A16 | 74LS164 |
| A18 | 74LS157 |
| A19 | 74LS109 |
| A20 | 74LS160 |
| A22 | 74LS174 |
| A23 | 74LS151 |
| A24 | 74LS174 |
| A26 | 74LS109 |
| A31A, B | 74LS86 |
| A32A, B | 74S08 |
| A33A, B | 74LS109 |
| A42A, B | 74S20 |
| A43 | 74S163 |
| A44A, B | 74S113 |
| A45 | 74S04 |
| A52 | 74S04 |
| A53 | 74S04 |
| A54 | 74S04 |

While the invention has been illustrated and described with reference to a particular illustrative embodiment and mode of practice, it will be apparent to those skilled in the art that various modifications and improvements may be made without departing from the scope and spirit of the invention.

For instance, while all nodes are dual function master/slave nodes in the illustrative and preferred embodiment, it is within the ambit and scope of my invention to employ a multinode communication system in which more than one and less than all of the nodes of the system are dual function master/slave nodes, and in which fixed slave modes nodes form other nodes in the system. Such fixed slave nodes may take any suitable slave node form compatible with the dual function master/slave nodes of the system, as for instance by having only the slave mode portions of the dual function master/slave nodes of the illustrative and preferred embodiment as shown and described herein. In such modification embodiment, any one or more of the nodes 13, up to a quantity of two less than the total loop nodes, may simply be fixed slave mode nodes. While this modification does not offer the full advantages of the illustrated and preferred embodiment and node of practice of the invention, in which all nodes are dual function master/slave nodes, it does afford a substantial measure of the advantages of the broad aspects of the invention, while affording some economy in cost of the overall loop system. Likewise, a system may be utilized in which one of the nodes does not employ the master/slave selector switch 18, and is hard-wired or otherwise connected to serve as loop master node, with suitable provision for this node dropping totally off the loop and becoming transparent to the loop in the event that this node becomes inoperable. In such event, the remaining loop node makeup and operation may be the same one as the presently illustrated and preferred embodiment and mode of practice or as the first mentioned alternative modification. It is also envisioned that a measure of the advantage of unbroken loop communication through the master node without necessity of breaking the loop, may be had even with a single loop-master-node multinode loop having all slaves (as in the manner of the slave mode construction and operation aspects of the presently illustrated and preferred dual function master/slave nodes) and with the single loop master node construction and operation being in accordance with the master mode construction and operation of the illustrated and preferred dual function master/slave nodes, or simply employing a single one of the presently illustrated dual function master/slave nodes 13 or with a suitable modification or other embodiment according to and affording this loop master aspect of the dual master/slave nodes synchronized according to the invention. Of course, as with the other less than preferred modification embodiments of various aspects or a portion of various aspects of the invention, this adaptation is much less desired, and effects only a portion, but an important portion, of the advantages of the invention as practiced according to the illustrated and preferred embodiment and mode of practice, various combinations of these alternative modifications, or of these alternative modifications and the illustrated and preferred embodiments may also be employed.

Accordingly, the invention is not to be limited by the particular illustrative embodiment and mode of practice, but only by the scope of the appended Claims.

I claim:

1. A multinode synchronous serial data closed loop communication system, comprising a plurality of nodes, including at least two synchronous dual function master/slave loop nodes, connected in a closed serial-data sequential synchronous node-to-node communication loop, each of said dual function master/slave nodes having the dual capability of selectively acting as either a loop master node providing a single loop time base or master clock for synchronous serial data sequential communication between each of said dual function master/slave loop nodes and each of the other of said dual function master/slave nodes, or as a slave node acting to slave in synchronism with said master clock provided by a single selected one of said dual function master/slave nodes which is acting as the instant loop master node, and means for switching one of said master/slave nodes from slave mode to master mode in response to detection of indication of absence of an effectively operating master node on said loop.

2. A multinode synchronous serial data closed loop communication system according to claim 1, including a plurality of said dual function master/slave nodes.

3. A multinode synchronous serial data closed loop communication system, comprising, a plurality of nodes, including at least two synchronous dual function master/slave loop nodes, connected in a closed serial-data sequential synchronous node-to-node communication loop, each of said dual function master/slave nodes having the dual capability of selectively acting as either a loop master node providing a single loop time base or master clock for synchronous serial data sequential communication between each of said dual function master/slave loop nodes and each of the other of said dual function master/slave nodes, or as a slave node acting to slave in synchronism with said master clock provided by a single elected one of said dual function master/slave nodes which is acting as the instant loop master node, each of said dual function master/slave nodes having loop master/slave select means responsive to detection of absence of an instant active loop master node on the loop, to effect assumption of loop master node status y each such dual function master slave node.

4. A multinode synchronous serial data closed loop communication system, comprising a plurality of nodes, including at least one synchronous dual function master/slave loop node, connected in a closed serial-data sequential synchronous node-to-node communication loop, each of said dual function master/slave nodes having the dual capability of selectively acting as either a loop master node providing a single loop time base or master clock for synchronous serial data sequential communication between each of said dual function master/slave loop nodes and each of the other of said dual function master/slave nodes, or as a slave node acting to slave in synchronism with said master clock provided by a single selected one of said dual function maste/slave nodes which is acting as the instant loop master node, each of said dual function master/slave nodes having loop master/slave select means responsive to detection of absence of an instant active loop master node on the loop, to effect assumption of loop master node status by each such dual function master/slave node, each of said dual function master/slave nodes having means for actuating the respective said master/-slave select means to master-select mode after passage of a different time period after said detection of absence of an instant active loop master node on the loop, as compared to the corresponding said time period for all others of said dual function master/slave nodes.

5. A multinode synchronous serial data closed loop communication system according to claim 1, each of said dual function master/slave nodes having a selectively loop-time-base-forming master clock, and master clock receive data synchronizing means for synchronizing received data with its respective said selectively loop-time-base-forming master clock.

6. A multinode synchronous serial data closed loop communication system, comprising, a plurality of nodes, including at least two synchronous dual function master/slave loop nodes, connected in a closed serial-data sequential synchronous node-to-node communication loop, each of said dual function master/slave nodes having the dual capability of selectively acting as either a loop master node providing a single loop time base or master clock for synchronous serial data sequential communication between each of said dual function master/slave loop nodes and each of the other of said dual function master/slave nodes, or as a slave node acting to slave in synchronism with said master clock provided by a single electled one of said dual function master/slave nodes which is acting as the instant loop master node, each of said dual function master/slave nodes having a selectively loop-time-base-forming master clock, and master clock receive data synchronizing means for synchronizing received data with its respective said selectively loop-time-base-forming master clock, said master clock receive data synchronizing means including phase-shifted-data-providing means for providing a selectively phase shifted form of data received at its respective said dual function master/slave node, as a function of the phase difference between a form of said received data and said selectively loop-time-base-forming master clock at the respective said dual function master/slave node, by an amount sufficient to enable effective sampling of said selectively phase shifted form of receive data by said selectively loop-time-base-forming master clock at the respective said dual function master/slave node.

7. A multinode synchronous serial data closed loop communication system according to claim 6, said phase-shifted-data-providing means including means for shifting a form of data received at its respective said node, through a plurality of preselected angles, to form a plurality of selectable differently phase-shifted forms of the data received at the respective said dual function master/slave node, and means for selecting one of said plurality of selectable differently phase-shifted forms of data as a function of the phase difference between a reference form of the data received at said respective dual function master/slave node and said selectively loop-time-base-forming master clock at the respective said dual function master/slave node.

8. A multinode synchronous serial data closed loop communication system according to claim 7, in which said reference form of the data received at said respective dual function master/slave node is receive data reclocked by recovered clock to form recovered clock receive data.

9. A multinode synchronous serial data closed loop communication system according to claim 8, further comprising at each of said dual function master/slave nodes, clock recovery means to form recovered clock in effective slaved frequency and phase synchronism with the instant said loop-time-base-forming master clock at the instant loop master node, and means for sampling raw received data with said recovered clock to form recovered clock receive data.

10. A multinode synchronous serial data closed loop communication system according to claim 9, in which said loop master/slave select means at each of said dual function master/slave nodes acts to select either of said master clock receive data and associated said loop-time-base-forming master clock at the respective said dual function master/-slave node, or the respective said recovered clock receive data at said associated recovered clock at the respective said dual function master/slave node, for internal processing and/or retransmittal of received data onto said loop, and/or transmittal of new data onto said loop.

11. A multinode synchronous serial data closed loop communication system according to claim 1, in which more than one and less than all of said nodes in said loop are dual function master/slave nodes, and in which said loop includes a fixed slave mode node.

12. A multinode serial data sequential node-to-node synchronous communication system, comprising a plurality of nodes interconnected in a closed sequential node-to-node synchronous serial data communication loop, one of said nodes having means for generating a loop-timing-base-forming master clock, and having the capacity and function of acting as the loop master node furnishing a loop time base master clock source for data on said loop, while the other said nodes act as slave nodes slaving to said loop timing base master clock, said one node having absolute phase synchronizing means which effects absolute phase synchronizing of data received by it from the loop with its own said master clock without necessity, at the respective one node having the capacity and function of acting as the loop master node, for removal and storage of data received from the loop, and retrieval/regeneration from storage and reformatting, of the storage-retrieved/regenerated received data and reinsertion onto the loop of such reformatted storage-retrieved/regenerated received data at said one node, in order to enable retransmission of the received data further along the loop, by said one node when acting as the loop master node.

13. A multinode serial data sequential node-to-node synchronous communication system, comprising a plurality of nodes interconnected in a closed sequential node-to-node synchronous serial data communication loop, one of said nodes having means for generating loop-time-base-forming master clock, and having the capacity of acting as the loop master node furnishing loop timing base or master clock source for data on said loop, while the other sid nodes act as slave nodes slaving to said loop time base, said one node having absolute phase synchronizing means for absolute phase synchronizing of data received by it from the loop with its own said master clock, said absolute phase synchronizing means including phase-shifted-data-providing means for providing a selectively phase-shifted form of data received at the respective said one node, as a function of the phase differences between a form of said received data and said loop-time-base-forming master clock at said one node, by an amount sufficient to enable effective sampling of said selectively phase-shifted form of receive data by said loop-time-base-forming master clock at said one node.

14. A multinode serial data sequential node-to-node synchronous communication system according to claim 13, means for shifting a form of data received at said one node by a plurality of preselected angles, to form a plurality of selectable differently phase-shifted forms of the data received at the said one node, and means for selecting one of said plurality of selectable differently phase-shifted forms of data as a function of the phase difference between a reference form of the data received at said one node and said loop-time-base-forming master clock at said one node.

15. A multinode serial data sequential node-to-node synchronous communication system according to claim 14, in which said reference form of the data received at said one node is receive data reclocked by recovered clock to form recovered clock receive data.

16. A multinode serial data sequential node-to-node synchronous communication system according to claim 15, including clock recovery means to form recovered clock in effective slaved frequency and phase synchronism with the data received at said one node and in frequency synchronism with said loop-time-base-forming master clock at said one node, and means for sampling raw received data with said recovered clock to form recovered clock receive data.

17. A multinode serial data sequential node-to-node synchronous communication system, comprising a plurality of synchronous dual function master/-slaves nodes interconnected in a closed sequential node-to-node synchronous serial data communication loop and each of which master/slave nodes communicates through employment of a master clock from a single one of said master/slave nodes acting as the master clock source for the entire loop, each of said dual function master/slave nodes having means for generating selectively a loop-time-base-forming master clock, and having the dual capacity of acting as either the loop master node furnishing loop timing base or master clock source for data on said loop, or as a slave node slaving to said loop time base, and having means for self-switching from slave node mode to master node mode as a function of detection of absence of effective operation of a master clock node on the loop.

18. A multinode serial data sequential node-to-node synchronous communication system according to claim 17, in which each of said dual function master/slave nodes has absolute phase synchronizing means for absolute phase synchronizing of data received by it from the loop with its own said master clock.

19. A multinode serial data sequential node-to-node synchronous communication system, comprising a plurality of synchronous dual function master/slave nodes interconnected in a closed sequential node-to-node synchronous serial data communication loop, each of said dual function master/slave nodes having means for generating selectively loop-time-base-forming master clock, and having the dual capacity of acting as either the loop master node furnishing loop timing base or master clock source for data on said loop, or as a slave node slaving to said loop time base, each of said dual function master/slave nodes having absolute phase synchronizing means for absolute phase synchronizing of data received by it from the loop with its own said master clock, said absolute phase synchronizing means including phase-shifted data providing means for providing a selectively phase-shifted form of data received at its respective said dual function master/slave node, as a function of the phase differences between a form of said received data and the said selectively loop-time-base-forming master clock at the respective said dual function master/slave node, by an amount sufficient to enable effective sampling of said selectively phase-shifted form of receive data by said selectively loop-time-base-forming master clock at the respective said dual function master/slave node.

20. A multinode serial data sequential node-to-node synchronous communication system according to claim 19, means for shifting a form of data received at the respective said node by a plurality of preselected angles, to form a plurality of selectable differently phase-shifted forms of the data received at the respective said dual function master/slave node, and means for selecting one of said plurality of selectable differently phase-shifted forms of data as a function of the phase difference between a reference form of the data received at said respective dual function master/slave node and said selectively loop-time-base-forming master clock at the respective said dual function master/slave node.

21. A multinode serial data sequential node-to-node synchronous communication system according to claim 20, in which said reference form of tthe data received at said respective dua function master/slave node is receive data reclocked by recovered clock to form recovered clock receive data.

22. A multinode serial data sequential node-to-node synchronous communication system according to claim 21, clock recovery means to form recovered clock in effective slaved synchronism with the instant said loop-time-base-forming master clock at the instant said loop master dual function master/slave node, and means for sampling raw received data with said recovered clock to form recovered clock receive data.

23. An absolute phase synchronizer for synchronizing data received at one node of a multinode synchronous loop communication system, with a loop-time-base or master clock at said one node, and which said one node has clock recovery means and means for forming recovered clock receive data, said absolute phase synchronizer comprising means for comparing the phase of recovered clock relative to said master clock, coarse phase-shifting means for coarse phase-shifting of the phase of received data as a function of the result of said comparing, by an amount enabling effective successive serial data sampling of received data by said master clock, and sampling means for successively serially sampling said coarse phase-shifted received data with master clock in absolute phase synchronization with said master clock.

24. An absolute phase synchronizer for synchronizing data received at one node of a multinode synchronous loop communication system, with a loop-time-base or master clock at said one node, and which said one node has clock recovery means and means for forming recovered clock receive data, said absolute phase synchronizer comprising means for comparing the phase of recovered clock relative to said master clock, coarse phase shifting means for coarse phase shifting of the phase of received data as a function of the result of said comparing, by an amount enabling effective sampling of received data by said master clock, sampling means for sampling said coarse phase shifted received data to thereby form master clock-sampled receive data in absolute phase synchronization with said master clock, said coarse phase-shifting means comprising:

a shift register clocked at a rate which is a selected multiple of the rate of said recovered clock, which shift register has said recovered clock receive data as its input for shifting thereof, and has multiple phase-shifted outputs, each of which outputs represents said recovered clock receive data inputted thereto, shifted by a given phase which is a function of said selected multiple, and of the shift position of each of the respective shift register outputs, and means for selecting one of said multiple phase-shifted outputs of said shift register as a function of the phase relationship deteced by said phase-comparing means, to thereby enable effective sampling of said selected phase-shifted output by said master clock to thereby enable master clock receive data to be formed, in absolute phase synchronism with said master clock.

25. Absolute phase synchronizing means for phase synchronizing binary data with a master binary clock which said binary data has effectively the frequency of said master clock but which may not be in phase with said master clock comprising:

means for forming a data-synchronized binary clock in synchronism with said binary data, phase-comparing means for comparing the phase of said data-synchronized binary clock with the phase of said master clock, coarse phase-shifting means for forming coarse phase-shifted data whose phase is shifted by a phase angle which based on the result of said comparing is an amount enabling effective sampling of said coarse phase-shifted data by said master clock, and means for sampling said coarse phase-shifted data with master clock to form master clock-sampled received data in absolute phase synchronization with said master clock.

26. Absolute phase synchronizing means according to claim 25, in which said coarse phase-shifting means comprises a shift register clocked at a rate which is a selected multiple of the rate of said data-synchronized clock, and which shift register has said binary data as its input and has multiple outputs, each of which represents the data inputted thereto shifted by a given phase which is a function of said selected multiple, and of the shift position of the given shift register output, and means for selecting one of said multiple phase-shifted outputs of said shift register as a function of the phase relationship detected by said phase-comparing means, to enable effective sampling of said selected phase shifted output by said one master clock, to thereby enable master clock binary data to be formed, in absolute phase synchronism with said master clock.

27. For use in a multinode data communication system in which data is serially passed from node to node, and in which a node has serial-to-parallel/parallel-to-serial data conversion means requiring a clock in synchronization with received and transmitted serial data processed by said data conversion means, the improvement of a composite master/slave node data/clock synchronizer capable of operating in either a master or a slave mode, comprising, clock recovery means for recovering clock from received data and for sampling received data with said recovered clock to thereby form recovered clock-sampled received data in both phase and frequency synchronization with said recovered clock, master clock means for generating a master clock, means for comparing the phase of recovered clock relative to said master clock, coarse phase shifting means for coarse phase-shifting of the phase of received data as a function of the result of said comparing, by an amount enabling effective sampling of received data by said master clock, sampling means for sampling said coarse phase-shifting received data to thereby form master clock-sampled received data in absolute phase synchronization with said master clock, and means for selecting one of said master clock or said recovered clock as an output for application as an input to said data conversion means and for concomitantly selecting the associated said master clock-sampled received data or said recovered clock-sampled received data as an output for application as an input to said data conversion means.

28. A data/clock synchronizer according to claim 27, in which said coarse phase-shifting means comprises means for shifting the phase of recovered clock-sampled received data to enable center-bit sampling by said master clock, said sampling means for sampling said coarse phase-shifted received data comprises means for center-bit sampling said phase-shifted recovered clock-sampled received data by said master clock to form master clock-sampled received data in absolute phase relation with said master clock.

29. For use in a multinode data communication system in which data is serially passed from node to node, and in which a node has serial-to-parallel/parallel-to-serial data conversion means requiring a clock in synchronization with received and transmitted serial data processed by said data conversion means, the improvement of a composite master/slave node data/clock synchronizer capable of operating in either a master or a slave mode, comprising clock recovery means for recovering clock from received data and for sampling received data with said recovered clock to thereby form recovered clock-sampled received data in both phase and frequency synchronization with said recovered clock, master clock means for generating a master clock, means for comparing the phase of recovered clock relative to said master clock, coarse phase-shifting means for coarse phase-shifting of the phase of received data as a function of the result of said comparing, by an amount enabling effecting sampling of received data by said master clock, sampling means for sampling said coarse phase-shifted received data to thereby form master clock-sampled received data in absolute phase synchronization with said master clock, means for selecting one of said master clock or said recovered clock as an output for application as an input to said data conversion means and for concomitantly selecting the associated said master clock-sampled received data or said recovered clock-sampled received data as an output for application as an input to said data conversion means, and go-ahead detection and generating means for detecting absence of both a multi-bit go-ahead token and intelligence-bearing data, and for generating and inserting a go-ahead token into the data stream upon detection of absence of said go-ahead token and intelligence-bearing data.

30. Apparatus according to claim 29, said go-ahead detection and generating means comprising a multi-bit binary counter which changes its binary output state to an opposite state from the instant input upon reaching its highest bit count as a function of receipt of a succession of n-bits of one given state, thereby effectively forming a go-ahead token composed of $(n-1)$ bits of said one given state followed by one bit of the opposite state.

31. Apparatus according to claim 29, multi-bit delay means providing a multi bit delay for said master clock-sampled received data, said multi-bid delay being at least as great as the bit length of the go-ahead token.

32. Apparatus according to claim 31, wherein said multi-bit delay is formed by a multi-bit shift register having said coarse phase-shifted received data as an input and which is clocked by the master clock.

33. Apparatus according to claim 32, said center bit sampling the reclocked received data with the multi-bit shift register first stage to thereby form master clock sampled received data.

34. The method of absolutely synchronizing the phase of binary data with a binary master clock in which the binary data has effectively the frequency of the master clock but may be out of phase with the master clock, comprising forming a binary data-synchronized clock synchronized with said particular binary data, comparing the phase of said data-synchronized clock with the phase of said master clock, forming coarse phase-shifted binary data which is coarse phase-shifted relative to said particular binary data if and as may be required as a function as the coarse phase angle difference detected by said comparing and by a coarse amount enabling effective sampling thereof by said master clock, and sampling said course phase-shifted data to thereby provide said binary data in absolute phase synchronization with said master binary clock.

35. The method according to claim 34, in which said forming of said course phase-shifted data is effected by coarse phase-shifting said particular binary data by a plurality of selected coarse angles to provide a plurality of differently coarse phase-shifted binary data selectable outputs, and selecting for master clock sampling, one of said plurality of selectable outputs as a function of the coarse phase angle difference detected by said comparing of the phase of the master clock with the data-synchronized clock.

36. The method of absolute phase synchronizing receive data from one location with a master clock at a second location in which receive clock is the receive clock at said second location and is in substantial frequency synchronism with said master clock but of no definite phase relationship relative to master clock, comprising generating a master clock in association with said second location, and which master clock is the time-base source of clock for said receive data, and absolute phase-synchronizing said receive data to absolute phase synchronism with said master clock by effectively sampling said receive data with master clock after coarse phase-shifting said receive data by an amount sufficient to enable effective sampling thereof by said master clock.

37. The method of absolute phase synchronizing receive data from one location with a master clock at a second location in which receive clock is the receive clock at said second location and is in substantial frequency synchronism with said master clock but of no definite phase relationship relative to master clock, comprising generating a master clock associated with said second location and which master clock is the time-base source of clock for said receive data, comparing the phase of said receive clock with the phase of said master clock, absolute phase-synchronizing said receive data to absolute phase synchronism with said master clock, said absolute phase-synchronizing being effected by coarse phase-shifting of said receive clock synchronized receive data relative to said master clock by an amount which, based on the phase difference between said receive clock and said master clock as indicated by said comparing of phases, is sufficient to enable effective sampling of said data by said master clock, and effectively sampling the resultant said phase-shifted data with said master clock to thereby synchronize said receive data in absolute phase with said master clock.

38. The method of synchronizing receive data with master clock, comprising generating a master clock of substantially constant frequency, generating a selectively variable frequency slave clock having a nominal frequency substantially corresponding to said master clock, comparing the phase relationship of said variable frequency slave clock with data transitions of receive data, selectively successively varying the frequency and phase of said variable frequency slave clock as a function of the phase relationship of said variable frequency slave clock with said data transitions of said receive data, to form recovered receive clock in substantial frequency synchronism with said receive data, reclocking said receive data with said variable frequency slave clock by sampling said receive data with said recovered receive clock formed by the updated said variable frequency clock to form recovered clock-synchronized receive data, comparing the phase of said recovered receive clock with the phase of said master clock, selectively shifting the phase of said recovered receive clock-synchronized receive data as a function of the amount of phase difference between said master clock and said recovered receive clock by an amount sufficient to enable effective sampling of said recovered receive clock-synchronized receive data by said master clock, and effectively sampling the resultant phase-shifted said recovered receive clock-synchronized receive data, to thereby form receive data in absolute phase synchronism with said master clock.

39. The method according to claim 38, further comprising carrying out the steps of claim 38, at each of a plurality of node locations serially interconnected along a loop from which said receive data is received, at one of said node locations acting as instant master mode, selecting said master clock receive data and transmitting such master clock receive data back onto the loop, and at all other instant loop node locations feeding the recovered receive clock-synchronized receive data back onto the loop.

* * * * *

UNITED STATES PATENT AND TRADEMARK OFFICE
CERTIFICATE OF CORRECTION

PATENT NO. : 4,677,614

DATED : June 30, 1987

INVENTOR(S) : Miles M. Circo

It is certified that error appears in the above-identified patent and that said Letters Patent are hereby corrected as shown below:

IN THE ABSTRACT

| Col | Line of the Abstract | Correction |
|---|---|---|
| 1 | 5 | "mode" should be ---node--- |

IN THE SPECIFICATION

| Col | Line | Correction |
|---|---|---|
| 1 | 19 | "commmunication" should be ---communication--- |
| 1 | 67 | "each" should be ---such--- |
| 3 | 62 | "RVC" should be ---RCV--- |
| 4 | 18 | "RXD" should be ---RxD--- |
| 4 | 38 | "RXD" should be ---RxD--- |
| 6 | 19 | "It if" should be ---If it--- |
| 9 | 32 | "S(RC)" should be ---S(RC))--- |
| 11 | 20 | after "control" insert ---token--- |
| 11 | 24 | "A78" should be ---A68--- |
| 11 | 56 | "serial" should be ---parallel--- |
| 16 | 19 | "effecting" should be ---effective--- |
| 16 | 29 | "RxD(RC+SEL 0)" should be ---RxD(RC+SEL ϕ)--- |
| 16 | 57 | "code" should be ---node--- |

UNITED STATES PATENT AND TRADEMARK OFFICE
CERTIFICATE OF CORRECTION

PATENT NO. : 4,677,614

DATED : June 30, 1987

INVENTOR(S) : Miles M. Circo

It is certified that error appears in the above-identified patent and that said Letters Patent are hereby corrected as shown below:

| | | |
|---|---|---|
| 18 | 8 | before "Clock" <u>insert</u> ---Tx--- |
| 18 | 30 | "RxD ($\overline{MC}$)" should be ---RxD(MC)--- |
| 18 | 31 | "RxD ($\overline{RC}$)" should be ---RxD(RC)--- |
| 19 | 28 | "ADLC" should be ---SDLC--- |
| 20 | 39 | "cock" should be ---clock--- |
| 22 | 4 | "ariable" should be ---variable |
| 23 | 11 | "RC" (second occurrence) should be ---$\overline{RC}$--- |
| 25 | 21 | "place" should be ---phase--- |
| 26 | 20 | before "forward" <u>insert</u> ---permit--- |
| 27 | 32 | ". Since" should be ---, since--- |
| 28 | 6 | "locic" should be ---logic--- |
| 28 | 42 | "$A_2$." should be ---$A_2$).--- |
| 28 | 62 | "$Q_3$" should be ---$Q_2$--- |
| 29 | 31 | "315" should be ---315°--- |
| 29 | 32 | "beings" should be ---being--- |
| 30 | 49 | after "selection" <u>insert</u> ---for--- |
| 30 | 64 | After "respectively" insert a comma ---,--- |

UNITED STATES PATENT AND TRADEMARK OFFICE

CERTIFICATE OF CORRECTION

PATENT NO. : 4,677,614

DATED : June 30, 1987

INVENTOR(S) : Miles M. Circo

It is certified that error appears in the above-identified patent and that said Letters Patent are hereby corrected as shown below:

| | | |
|---|---|---|
| 30 | 65 | "selective" should be ---selection--- |
| 30 | 67 | ". will" should be ---, will--- |
| 31 | 54 | "recover recovered" should be ---recover/recovered--- |
| 32 | 57 | "VD40)" should be ---VD40))--- |
| 33 | 16 | "sence" should be ---sense--- |
| 33 | 26 | ", which" should be ---,(which--- |
| 34 | 32 | After "A43-13" (first occurrence) delete "and A43-13" |
| 35 | 26 | "dlock" should be ---clock--- |
| 35 | 40 | "practive" should be ---practice--- |
| 36 | 13 | "modes" should be ---mode--- |
| 36 | 24 | "node" should be ---mode--- |

IN THE CLAIMS

| Claim | Col | Line | Correction |
|---|---|---|---|
| 2 | 37 | 23 | "including" should begin a new paragaraph |
| 3 | 37 | 46 | "y" should be ---by--- |
| 4 | 37 | 63 | "maste" should be ---master--- |
| 6 | 38 | 33 | "electled" should be ---selected--- |

UNITED STATES PATENT AND TRADEMARK OFFICE
CERTIFICATE OF CORRECTION

PATENT NO. : 4,677,614

DATED : June 30, 1987

INVENTOR(S) : Miles M. Circo

It is certified that error appears in the above-identified patent and that said Letters Patent are hereby corrected as shown below:

| | | | |
|---|---|---|---|
| 11 | 39 | 38 | this line, beginning with "in said", should be double indented |
| 13 | 40 | 8 | "sid" should be ---said--- |
| 21 | 41 | 62 | "tthe" should be ---the--- |
| 21 | 41 | 63 | "dua" should be ---dual--- |
| 24 | 42 | 58 | "deteced" should be ---detected--- |
| 27 | 43 | 58/59 | "phase-shifting" should be ---phase-shifted--- |
| 31 | 44 | 66 | "multi-bid" should be ---multi-bit--- |
| 35 | 45 | 28 | "course" should be ---coarse--- |

IN THE DRAWINGS

In Figures 1 and 2, the reference character "MC/RC(Sel)" for the Clock input line into SDLC controller A25 should be ---$\overline{MC}/\overline{RC}$(Sel)

In Figure 2, the reference characters "13" and "14" shown for switch contacts of switch A18 should be ---6--- and ---5--- respectively, and the reference characters "5" and "6" shown for switch contacts of Switch A18 should be ---14--- and ---13--- respectively.

In Figure 2, the input and output connections to and from the contactor and the contacts of switch A68 should be as shown in Figure 1 for this switch A68 and the connection between the Tx output of SDLC controller A25 and driver DRV should be as shown in Figure 1.

UNITED STATES PATENT AND TRADEMARK OFFICE
CERTIFICATE OF CORRECTION

PATENT NO. : 4,677,614

DATED : June 30, 1987

INVENTOR(S) : Miles M. Circo

It is certified that error appears in the above-identified patent and that said Letters Patent are hereby corrected as shown below:

In Figure 3B, the output line from M/S Sel. Sw. A18 designated by the reference character "RC/ or /MC" and which is indicated in this Figure as going to SDLC, should be designated as ---$\overline{MC}$/$\overline{RC}$(Sel)---.

Signed and Sealed this

Fourteenth Day of March, 1989

*Attest:*

DONALD J. QUIGG

*Attesting Officer*

*Commissioner of Patents and Trademarks*